United States Patent
Dal Mutto et al.

(10) Patent No.: US 10,453,185 B2
(45) Date of Patent: Oct. 22, 2019

(54) SYSTEM AND METHOD FOR HIGH DYNAMIC RANGE DEPTH CAPTURE USING MULTIPLE CAMERAS

(71) Applicant: Aquifi, Inc., Palo Alto, CA (US)

(72) Inventors: Carlo Dal Mutto, Sunnyvale, CA (US); Abbas Rafii, Palo Alto, CA (US); Pietro Salvagnini, Sunnyvale, CA (US); Aryan Hazeghi, Palo Alto, CA (US); Michele Stoppa, Sunnyvale, CA (US); Francesco Peruch, Sunnyvale, CA (US); Giulio Marin, Sunnyvale, CA (US)

(73) Assignee: AQUIFI, INC., Palo Alto, CA (US)

( * ) Notice: Subject to any disclaimer, the term of this patent is extended or adjusted under 35 U.S.C. 154(b) by 69 days.

(21) Appl. No.: 15/341,954

(22) Filed: Nov. 2, 2016

(65) Prior Publication Data

US 2017/0142312 A1 May 18, 2017

Related U.S. Application Data

(60) Provisional application No. 62/254,555, filed on Nov. 12, 2015.

(51) Int. Cl.
*G06T 5/00* (2006.01)
*G06T 7/00* (2017.01)
(Continued)

(52) U.S. Cl.
CPC .............. *G06T 5/002* (2013.01); *G06T 7/285* (2017.01); *G06T 7/521* (2017.01); *H04N 5/332* (2013.01);
(Continued)

(58) Field of Classification Search
CPC ............ G06T 2207/10028; G06T 2207/10048
(Continued)

(56) References Cited

U.S. PATENT DOCUMENTS

2011/0249864 A1* 10/2011 Venkatesan ........ G01B 11/2509
382/103
2013/0329015 A1* 12/2013 Pulli .................... H04N 13/239
348/47

(Continued)

*Primary Examiner* — Deirdre L Beasley
(74) *Attorney, Agent, or Firm* — Lewis Roca Rothgerber Christie LLP

(57) ABSTRACT

A method for capturing a depth map includes: controlling a plurality of cameras to capture, concurrently, a plurality of first images during a first exposure interval, each of the cameras concurrently capturing a corresponding one of the first images, the cameras having overlapping fields of view; controlling a projection source to emit light at a first illumination level during the first exposure interval; controlling the cameras to capture, concurrently, a plurality of second images during a second exposure interval, each of the cameras concurrently capturing a corresponding one of the second images; controlling the projection source to emit light at a second illumination level during the second exposure interval, the second illumination level being different from the first illumination level; combining the first images with the second images to generate a depth map; and outputting the depth map.

30 Claims, 14 Drawing Sheets (4 of 14 Drawing Sheet(s) Filed in Color)

(51) Int. Cl.
    *G06T 7/20*       (2017.01)
    *H04N 13/00*     (2018.01)
    *H04N 5/33*      (2006.01)
    *H04N 5/235*     (2006.01)
    *H04N 13/106*    (2018.01)
    *H04N 13/254*    (2018.01)
    *H04N 13/257*    (2018.01)
    *H04N 13/271*    (2018.01)
    *H04N 13/296*    (2018.01)
    *H04N 13/243*    (2018.01)
    *H04N 13/25*     (2018.01)
    *G06T 7/521*     (2017.01)
    *G06T 7/285*     (2017.01)

(52) U.S. Cl.
    CPC ......... *H04N 13/106* (2018.05); *H04N 13/243* (2018.05); *H04N 13/25* (2018.05); *H04N 13/254* (2018.05); *H04N 13/257* (2018.05); *H04N 13/271* (2018.05); *H04N 13/296* (2018.05); *G06T 2207/10016* (2013.01); *G06T 2207/10028* (2013.01); *G06T 2207/10048* (2013.01); *H04N 2013/0081* (2013.01)

(58) Field of Classification Search
    USPC .......................................................... 348/47
    See application file for complete search history.

(56) References Cited

U.S. PATENT DOCUMENTS

| | | | |
|---|---|---|---|
| 2015/0022693 A1* | 1/2015 | Appia | H04N 5/2355 348/239 |
| 2016/0171768 A1* | 6/2016 | Park | G06T 19/006 348/42 |
| 2016/0189387 A1* | 6/2016 | Kannan | G01B 11/2545 382/106 |
| 2016/0261807 A1* | 9/2016 | Seshadrinathan | H04N 5/2258 |
| 2016/0330434 A1* | 11/2016 | Chen | G06T 7/0051 |
| 2016/0349043 A1* | 12/2016 | Lee | G01B 11/2513 |
| 2016/0360074 A1* | 12/2016 | Winer | H04N 5/2353 |
| 2017/0034499 A1* | 2/2017 | Doron | H04N 13/025 |

* cited by examiner

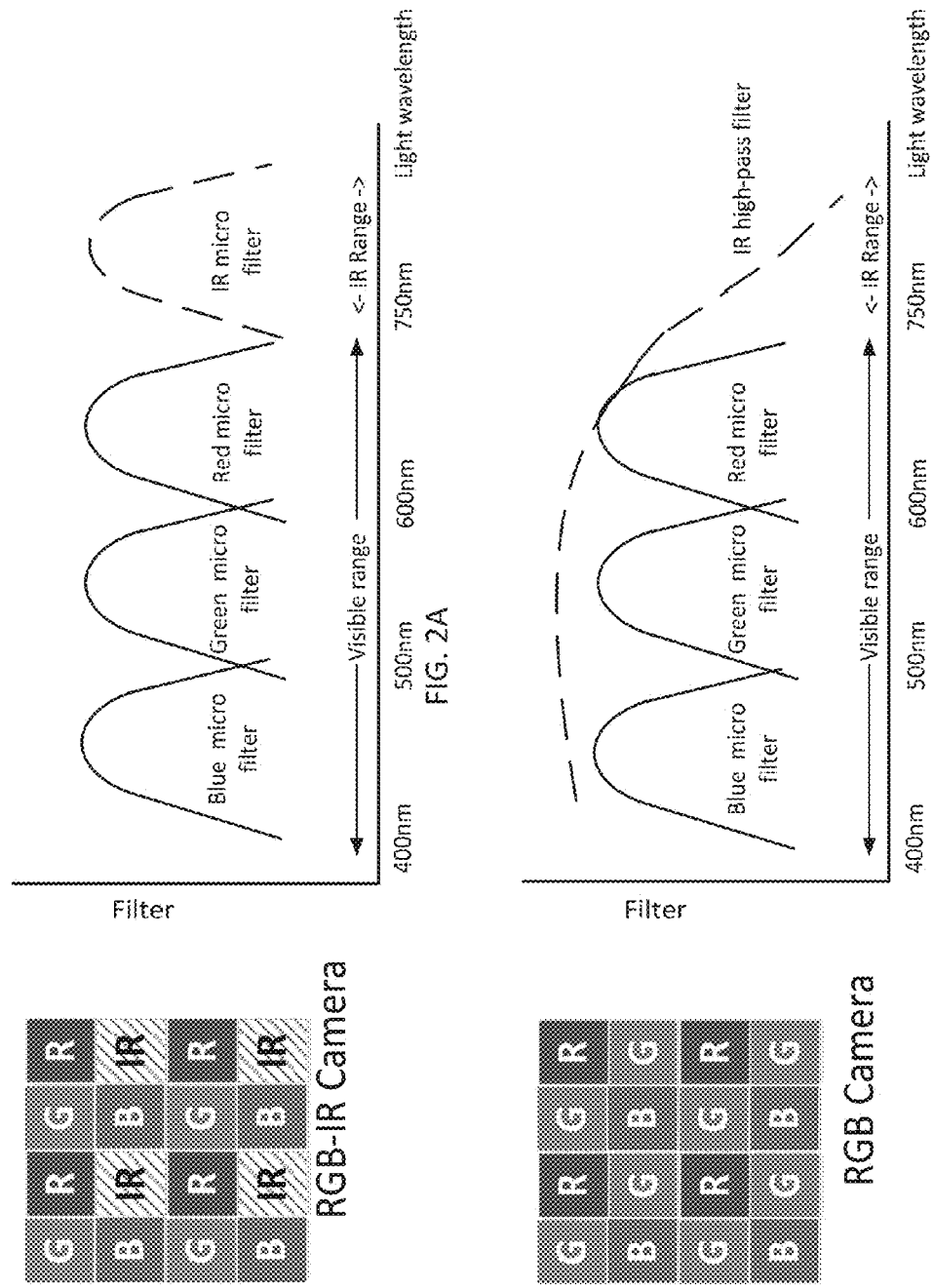

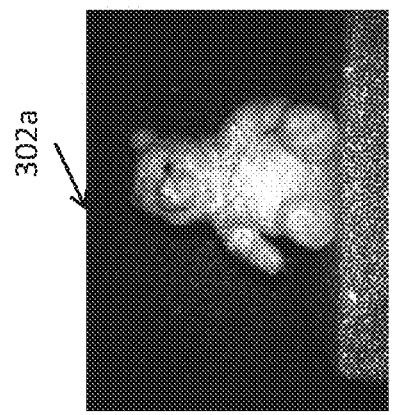
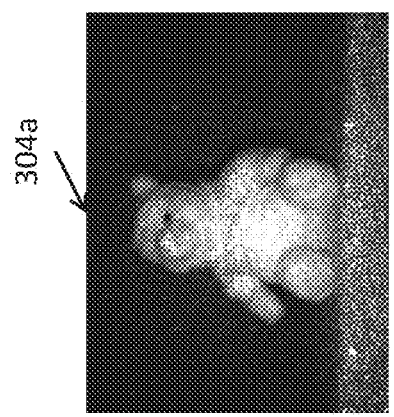
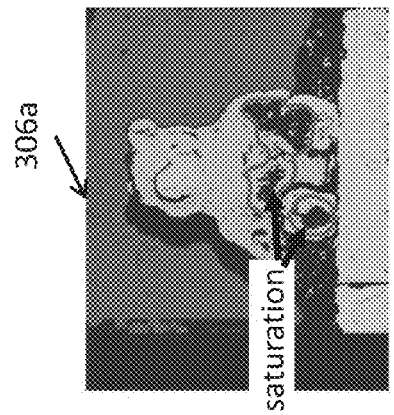
FIG. 3A
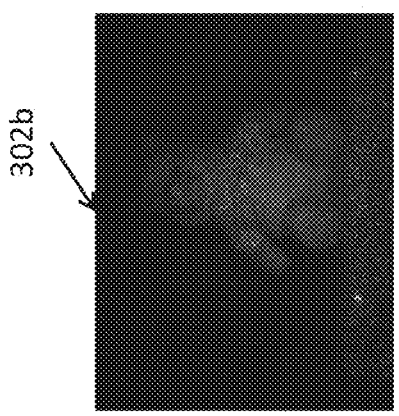
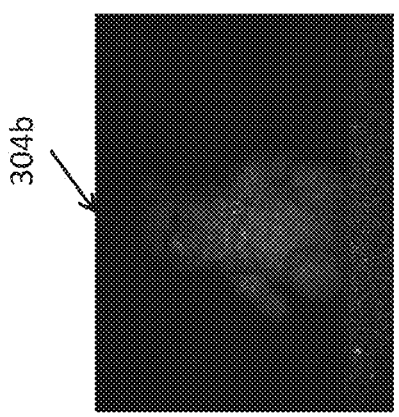
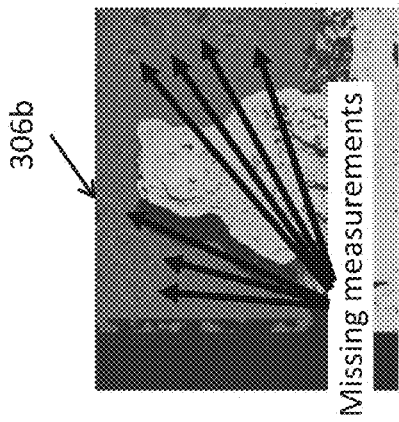
FIG. 3B

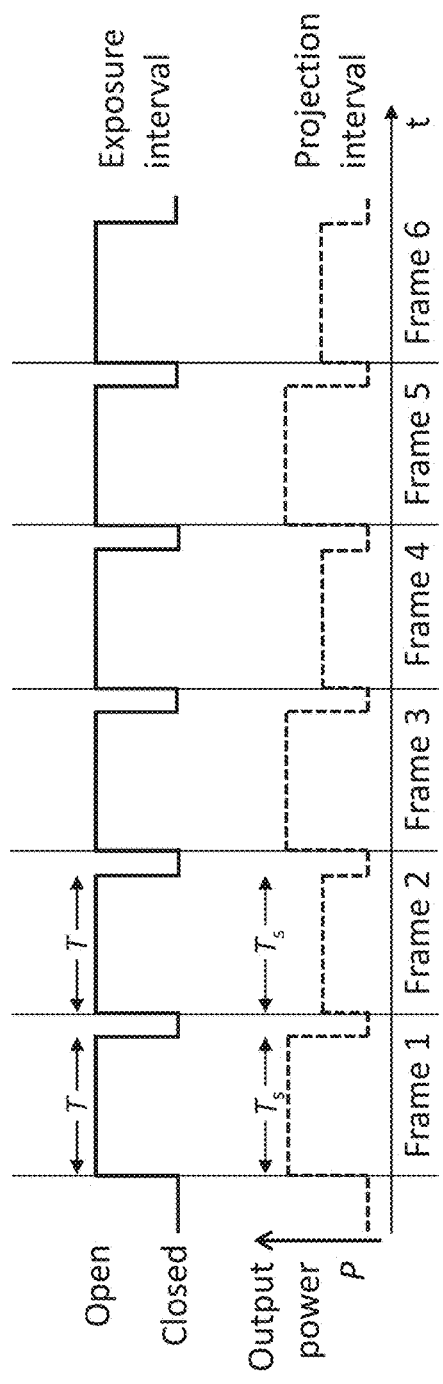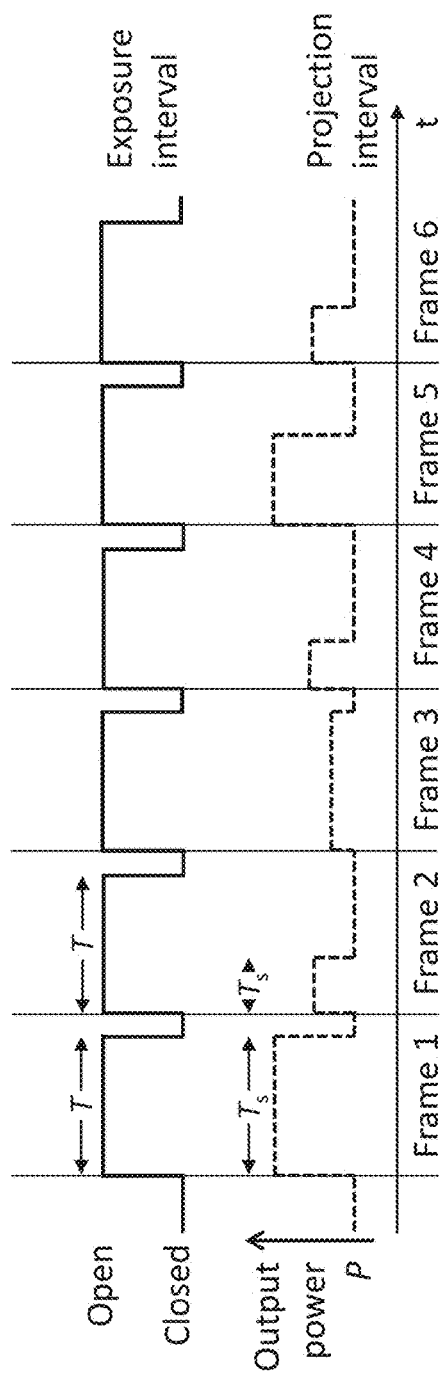

SYSTEM AND METHOD FOR HIGH DYNAMIC RANGE DEPTH CAPTURE USING MULTIPLE CAMERAS

CROSS-REFERENCE TO RELATED APPLICATION(S)

This application claims the benefit of U.S. Provisional Patent Application No. 62/254,555, filed in the United States Patent and Trademark Office on Nov. 12, 2015, the entire disclosure of which is incorporated herein by reference.

FIELD

Aspects of embodiments of the present invention relate to the field of depth camera systems.

BACKGROUND

A depth camera system or a range camera can be used to capture depth information about a scene. In particular, a depth camera system can generate a two-dimensional image or "depth map" where each value in the image corresponds to the distance between the depth camera and a portion of the scene that is in the field of view of the camera. The depth information may also be referred to as three-dimensional information, and the resulting depth map may be referred to as a three-dimensional reconstruction of the scene. This can be contrasted with a traditional camera, which captures the amount of light received from portions of the scene in the field of view of the camera, but not the distances of the objects and other features of the scene.

One class of depth camera systems uses a projection system or projection source to assist in the reconstruction of the depth information by projecting light onto a scene. Such systems may be referred to herein as being "active," as contrasted with "passive" depth camera systems that do not include a projection system. These include: projecting an encoded pattern, such as those commonly used in structured-light methods; projecting a pattern to create a texture on the scene; and projecting a pattern that is designed or optimized for three-dimensional reconstruction. Projecting a texture or a pattern designed for three-dimensional reconstruction is typically used with systems that include two or more cameras.

SUMMARY

Aspects of embodiments of the present invention relate to a methodology for increasing the depth dynamic range of an active depth camera system using multiple cameras by modulating the illumination level of the active projection system of the active depth camera system.

According to one embodiment of the present invention, a depth camera system includes: a processor; a plurality of cameras coupled to the processor and configured to have overlapping fields of view; a projection source coupled to the processor and configured to emit light toward the fields of view of the cameras; and memory coupled to the processor, the memory storing instructions that, when executed by the processor, cause the processor to: control the cameras to capture, concurrently, a plurality of first images during a first exposure interval, each of the cameras concurrently capturing a corresponding one of the first images; control the projection source to emit light at a first illumination level during the first exposure interval; control the cameras to capture, concurrently, a plurality of second images during a second exposure interval, each of the cameras concurrently capturing a corresponding one of the second images; control the projection source to emit light at a second illumination level during the second exposure interval, the second illumination level being different from the first illumination level; combine the first images with the second images to generate a depth map; and output the depth map.

The first illumination level may be a lower illumination level than the second illumination level.

The memory may further store instructions that, when executed by the processor, cause the processor to: control the projection source to emit light at the first illumination level during the first exposure interval by emitting light for a first emission interval having a length shorter than the first exposure interval; and control the projection source to emit light at the second illumination level during the second exposure interval by emitting light for a second emission interval having a length longer than the first emission interval and shorter than or equal to the second exposure interval.

The memory may further store instructions that, when executed by the processor, cause the processor to: control the projection source to emit light at the first illumination level during the first exposure interval by emitting light for at a first emission power; and control the projection source to emit light at the second illumination level during the second exposure interval by emitting light at a second emission power greater than the first emission power.

The cameras may be infrared cameras, and wherein the projection source may be configured to emit infrared light.

The projection source may be configured to emit an infrared pattern.

The projection source may be configured to emit light having a pattern.

The pattern may be configured to be detectable at different illumination levels.

The cameras may be configured to capture images using a global shutter.

The memory may further store instructions that, when executed by the processor, cause the processor to control the projection source to emit light at a third illumination level, the third illumination level being different from the first illumination level and different from the second illumination level.

The depth camera system may further include a second projection source, and the memory may further store instructions that, when executed by the processor, cause the processor to control the second projection source to emit light at a fourth illumination level different from the first illumination level and different from the second illumination level.

The memory may further store one or more previously captured images, and the memory may further store instructions that, when executed by the processor, cause the processor to: analyze a brightness of at least one of the one or more previously captured images; and set the second illumination level in accordance with a comparison of the brightness with a model brightness.

The projection source may be configured to emit, selectively, one of a plurality of patterns at a time, each of the patterns corresponding to one of a plurality of illumination levels, and wherein the second illumination level may be set by selecting a pattern from the plurality of patterns.

The memory may further store one or more previously captured images, and the memory may further store instructions that, when executed by the processor, cause the processor to: identify first portions of the first images having features matching second portions of the second images;

detect motion portions of the second images in accordance with locations of the first portions and the second portions; and compute portions of the depth map corresponding to the motion portions in accordance with only the second images.

The memory may further store one or more previously captured images, and wherein the memory may further store instructions that, when executed by the processor, cause the processor to compensate for motion using optical flow estimation by: detecting portions of the images of the cameras subject to motion; warping a previously captured image of the previously captured images; and computing a depth estimate based on the second images and the warped previously captured images.

The projection source may be configured to emit structured light.

According to one embodiment of the present invention, a method for capturing a depth map in a scene having high dynamic range includes: controlling, by a processor, a plurality of cameras to capture, concurrently, a plurality of first images during a first exposure interval, each of the cameras concurrently capturing a corresponding one of the first images, the cameras having overlapping fields of view; controlling, by the processor, a projection source to emit light at a first illumination level during the first exposure interval; controlling, by the processor, the cameras to capture, concurrently, a plurality of second images during a second exposure interval, each of the cameras concurrently capturing a corresponding one of the second images; controlling, by the processor, the projection source to emit light at a second illumination level during the second exposure interval, the second illumination level being different from the first illumination level; combining, by the processor, the first images with the second images to generate a depth map; and outputting the depth map.

The method may further include: controlling, by the processor, the projection source to emit light at the first illumination level during the first exposure interval by emitting light for a first emission interval having a length shorter than the first exposure interval; and controlling, by the processor, the projection source to emit light at the second illumination level during the second exposure interval by emitting light for a second emission interval having a length longer than the first emission interval and shorter than or equal to the second exposure interval.

The method may further include: controlling, by the processor, the projection source to emit light at the first illumination level during the first exposure interval by emitting light for at a first emission power; and controlling, by the processor, the projection source to emit light at the second illumination level during the second exposure interval by emitting light at a second emission power greater than the first emission power.

The method may further include controlling, by the processor, the projection source to emit light at a third illumination level, third illumination level being different from the first illumination level and different from the second illumination level.

The method may further include controlling a second projection source to emit light at a fourth illumination level different from the first illumination level and the second illumination level.

The method may further include: storing, by the processor, the first images in a memory coupled to the processor; analyzing, by the processor, a brightness of at least one of the first images; and setting, by the processor, the second illumination second illumination level in accordance with a comparison of the brightness with a model brightness.

The method may further include: storing, by the processor, the first images and the second images in a memory coupled to the processor; identifying, by the processor, first portions of the first images having features matching second portions of the second images; detecting, by the processor, motion portions of the second images in accordance with locations of the first portions and the second portions; and compute portions of the depth map corresponding to motion portions in accordance with only the second images. The method may further include: storing, by the processor, the first images and the second images in a memory coupled to the processor; detecting, by the processor, portions of the images of the cameras subject to motion; warping, by the processor, a previously captured image of the previously captured images; and computing, by the processor, a depth estimate based on the second images and the warped previously captured images.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, together with the specification, illustrate exemplary embodiments of the present invention, and, together with the description, serve to explain the principles of the present invention.

FIGS. 2A and 2B compare the architecture of a multi-channel RGB-IR camera sensor with that of a conventional RGB camera sensor.

FIG. 3A depicts master and slave images captured while a scene is illuminated with a high illumination level and the resulting depth image computed from the master and slave images.

FIG. 3B depicts master and slave images while the scene is illuminated with a low illumination level and the resulting depth image computed from the master and slave images.

FIGS. 5A and 5B are timing diagrams illustrating the power of light emitted by a projection system during the capture of a plurality of frames captured by the depth camera system according to some embodiments of the present invention.

DETAILED DESCRIPTION

Figure 1:
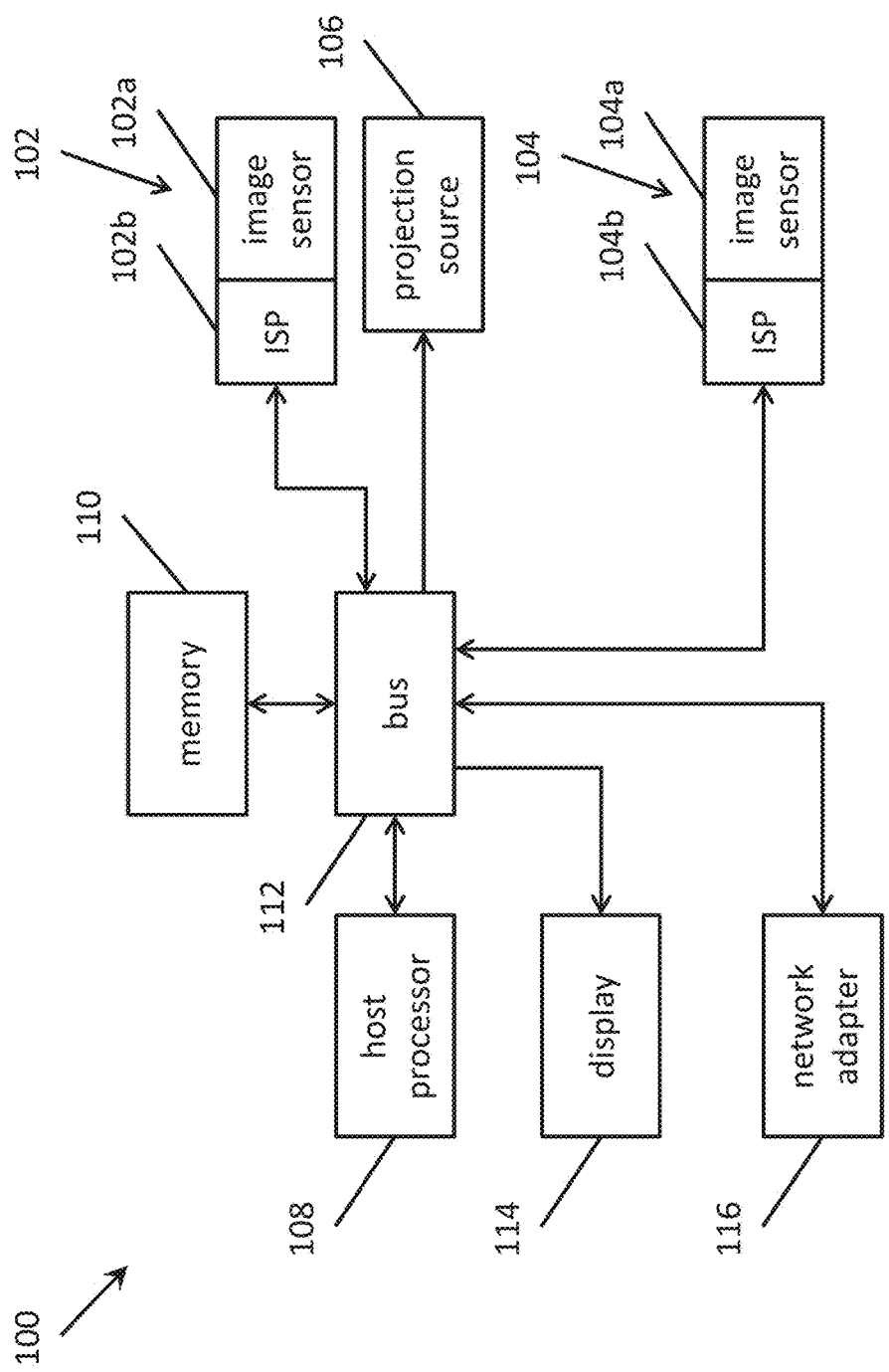
FIG. 1 is a block diagram illustrating an image capture system 100 according to one embodiment of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

As discussed above, camera systems frequently include illumination sources to supplement or provide lighting to a scene. For example, a camera flash can provide a burst of additional light in still photography, and continuous lighting may provide light in video. This supplemental illumination allows these camera systems to capture detail in portions of the scene that would otherwise be too dark to capture any useful information, in other words, where the signal to noise ratio is too low.

In a similar manner, a depth camera system may also use a projection source to provide supplemental illumination to allow the capture of information about the features of a scene even when the scene is too dark to detect any features. Furthermore, even when a scene may generally be well-lit, the projection source can also project a pattern that provides texture to surfaces in the scene that may otherwise be featureless, thereby allowing detection of the shapes of those featureless surfaces. In some embodiments, the projection source emits structured light, such as a pattern of grids or horizontal bars. In some embodiments, the pattern is a dot pattern that is designed such that every local patch of the pattern is unique across the entire emitted pattern. The projection system may emit visible light (e.g., light within the human visible spectrum) or may emit invisible light (e.g., light outside of the human visible spectrum, such as infrared light).

In many circumstances, the ability of the camera or cameras of the depth camera system to detect the light emitted by the projection system depends on, for example, the output illumination level of the projection source, the amount of texture or detectable features in the objects in the scene, the ambient illumination levels, and the distance to objects in the scene. As one example, objects that are farther from the projection source require additional illumination, due to light falloff at a rate proportional to the inverse square of the distance to the object. As another example, portions of the scene that are already well-lit may require a lower level of illumination, whereas dark portions of the scene may require a higher level of illumination. Furthermore, portions of the scene that are brightly lit, but have surfaces with substantially no texture (e.g., a brightly lit, featureless wall) may require high illumination level to produce a detectable signal on the brightly lit surfaces.

Because the illumination requirements can vary across the scene due to the ambient illumination and distance of objects in a scene, any single image captured with a given set of exposure settings may not be able to provide enough information about features to generate a depth map over the entire field of view of the camera system. These exposure settings may include exposure interval (e.g., shutter speed), camera aperture (e.g., f-stop), image sensor gain (e.g., ISO), and illumination level (e.g., guide number).

High dynamic range or HDR techniques may be used to address these issues. When applying HDR techniques, multiple images that are captured using different exposure settings are combined into a single image, such that the resulting image includes details in both dimly light and brightly lit portions of the scene.

Embodiments of the present invention relate to systems and methods for performing high dynamic range stereo depth capture. According to some embodiments of the present invention, the projection source is controlled to emit light at a plurality of different illumination levels during the captures of the images, thereby improving the capture of features in both dimly lit and brightly lit areas within the field of view of the depth camera system. This, in turn, improves the generation of a 3D depth map of the scene.

Depth Camera Systems

FIG. 1 is a block diagram illustrating an image capture system 100 according to one embodiment of the present invention. The image capture system 100 shown in FIG. 1 includes a first camera 102, a second camera 104, a projection source 106 (or illumination source or active projection system), and a host processor 108 and memory 110, wherein the host processor may be, for example, a graphics processing unit (GPU), a more general purpose processor (CPU), an appropriately configured field programmable gate array (FPGA), or an application specific integrated circuit (ASIC). The first camera 102 and the second camera 104 include corresponding image sensors 102a and 104a, and may also include corresponding image signal processors (ISP) 102b and 104b. The various components may communicate with one another over a system bus 112. The image capture system 100 may include additional components such as a display 114 to allow the device to display images, and a network adapter 116 to communicate with other devices. The image capture system may also include other components for communicating with other devices, such as a universal serial bus (USB) interface controller.

Figure 2C:
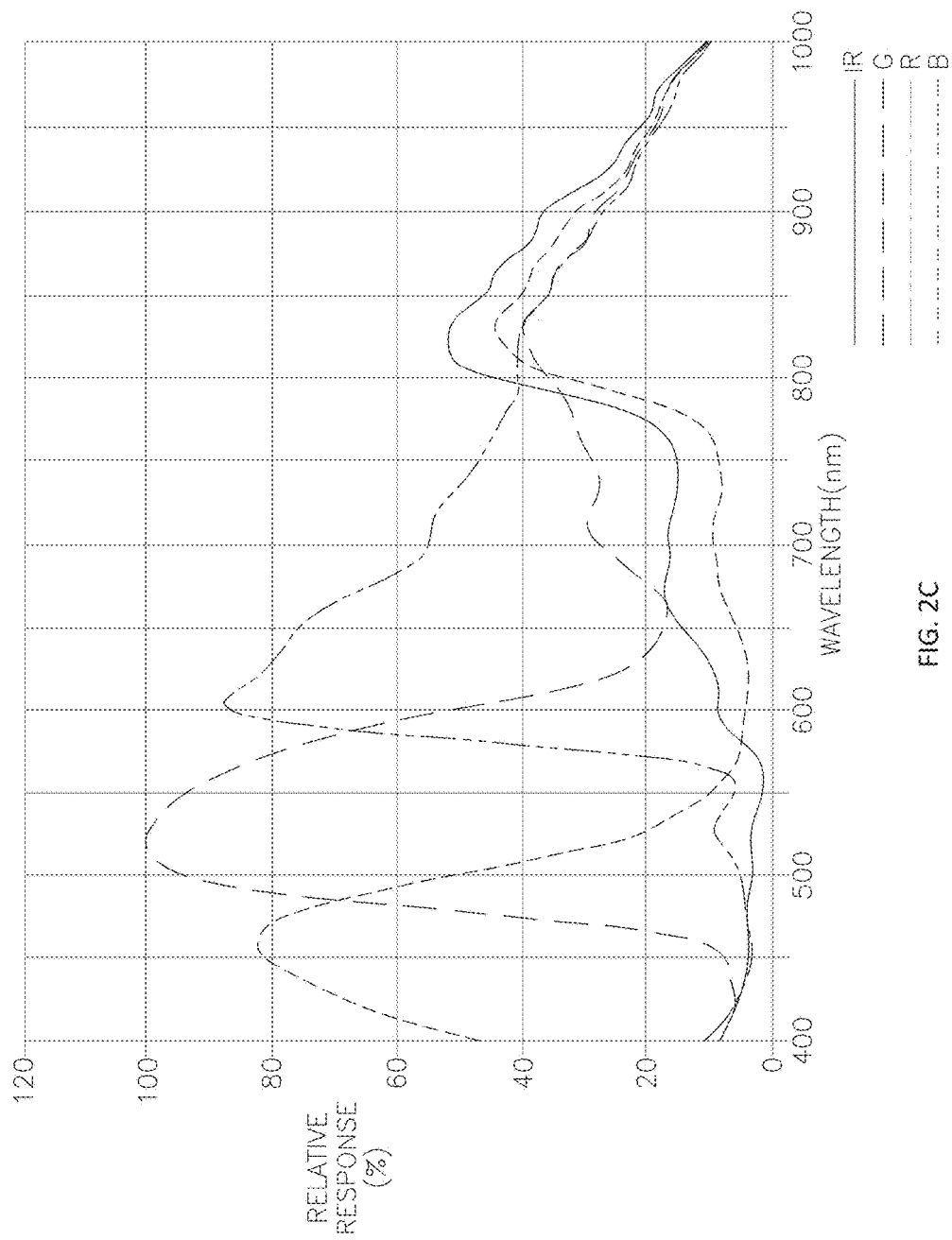
FIG. 2C is a graph depicting example relative response of infrared (IR), green (G), red (R), and blue (B) filters to light in the range of 400 nm to 1000 nm.

In some embodiments, the image sensors 102a and 104a of the cameras 102 and 104 are RGB-IR image sensors, as shown in FIG. 2A. Sensors that are capable of detecting visible light (e.g., red-green-blue, or RGB) and invisible light (e.g., infrared or IR) information may be standard charged coupled device (CCD) or complementary metal oxide semiconductor (CMOS) sensors. FIGS. 2A and 2B compare the architecture of an RGB-IR image sensor with that of a conventional RGB image sensor. Generally, as shown in FIG. 2B, a conventional RGB camera sensor includes pixels arranged in a "Bayer layout" or "RGBG layout," which is 50% green, 25% red, and 25% blue. Band pass filters (or "micro filters") are placed above individual photodiodes for each of the green, red, and blue wavelengths in accordance with the Bayer layout. Generally, a conventional RGB camera sensor also includes an infrared (IR) filter or IR cut-off filter (formed, e.g., as part of the lens or as a coating on the entire chip) which further blocks signals in an IR portion of electromagnetic spectrum, as illustrated by the dashed line in FIG. 2B.

An RGB-IR sensor as illustrated in FIG. 2A is substantially similar to a conventional RGB sensor, but may include different color filters. For example, as shown in FIG. 2A, in an RGB-IR sensor, one of the green filters in every group of four photodiodes is replaced with an IR band-pass filter (or micro filter) to create a layout that is 25% green, 25% red, 25% blue, and 25% infrared, where the infrared pixels are intermingled among the visible light pixels. In addition, the IR cut-off filter may be omitted from the RGB-IR sensor, the IR cut-off filter may be located only over the pixels that detect red, green, and blue light, or the IR filter can be designed to pass visible light as well as light in a particular wavelength interval (e.g., 840-860 nm). An image sensor capable of capturing light in multiple portions or bands or spectral bands of the electromagnetic spectrum (e.g., red, blue, green, and infrared light) will be referred to herein as a "multi-channel" image sensor.

In some embodiments of the present invention, the image sensors 102a and 104a are conventional visible light sensors. In some embodiments of the present invention, the system includes one or more visible light cameras (e.g., RGB cameras) and, separately, one or more invisible light cameras (e.g., IR cameras, where an IR band-pass filter is located across all over the pixels).

Generally speaking, a stereoscopic depth camera system includes at least two cameras that are spaced apart from each other and rigidly mounted to a shared structure such as a rigid frame. The cameras are oriented in substantially the same direction (e.g., the optical axes of the cameras may be substantially parallel) and have overlapping fields of view. These individual cameras can be implemented using, for example, a complementary metal oxide semiconductor (CMOS) or a charge coupled device (CCD) image sensor with an optical system (e.g., including one or more lenses) configured to direct or focus light onto the image sensor. The optical system can determine the field of view of the camera.

In the following discussion, the image acquisition system of the depth camera system may be referred to as having at least two cameras, which may be referred to as a "master" camera and one or more "slave" cameras. Generally speaking, the estimated depth or disparity maps computed from the point of view of the master camera, but any of the cameras may be used as the master camera. As used herein, terms such as master/slave, left/right, above/below, first/second, and CAM1/CAM2 are used interchangeably unless noted. In other words, any one of the cameras may be master or a slave camera, and considerations for a camera on a left side with respect to a camera on its right may also apply, by symmetry, in the other direction. In addition, while the considerations presented below may be valid for various numbers of cameras, for the sake of convenience, they will generally be described in the context of a system that includes two cameras.

To detect the depth of a feature in a scene imaged by the cameras, the depth camera system determines the pixel location of the feature in each of the images captured by the cameras. The distance between the features in the two images is referred to as the disparity, which is inversely related to the distance or depth of the object. (This is the effect when comparing how much an object "shifts" when viewing the object with one eye at a time—the size of the shift depends on how far the object is from the viewer's eyes, where closer objects make a larger shift and farther objects make a smaller shift and objects in the distance may have little to no detectable shift.) Techniques for computing depth using disparity are described, for example, in R. Szeliski. "Computer Vision: Algorithms and Applications", Springer, 2010 pp. 467 et seq.

The size of the disparity between the master and slave cameras depends on physical characteristics of the depth camera system, such as the pixel resolution of cameras, distance between the cameras and the fields of view of the cameras. Therefore, to generate accurate depth measurements, the depth camera system (or depth perceptive depth camera system) is calibrated based on these physical characteristics.

In some depth camera systems, the cameras may be arranged such that horizontal rows of the pixels of the image sensors of the cameras are substantially parallel. Image rectification techniques can be used to accommodate distortions to the images due to the shapes of the lenses of the cameras and variations of the orientations of the cameras.

In more detail, camera calibration information can provide information to rectify input images so that epipolar lines of the equivalent camera system are aligned with the scanlines of the rectified image. In such a case, a 3D point in the scene projects onto the same scanline index in the master and in the slave image. Let $u_m$ and $u_s$ be the coordinates on the scanline of the image of the same 3D point p in the master and slave equivalent cameras, respectively, where in each camera these coordinates refer to an axis system centered at the principal point (the intersection of the optical axis with the focal plane) and with horizontal axis parallel to the scanlines of the rectified image. The difference $u_s-u_m$ is called disparity and denoted by d; it is inversely proportional to the orthogonal distance of the 3D point with respect to the rectified cameras (that is, the length of the orthogonal projection of the point onto the optical axis of either camera).

Stereoscopic algorithms exploit this property of the disparity. These algorithms achieve 3D reconstruction by matching points (or features) detected in the left and right views, which is equivalent to estimating disparities. Block matching (BM) is a commonly used stereoscopic algorithm. Given a pixel in the master camera image, the algorithm computes the costs to match this pixel to any other pixel in the slave camera image. This cost function is defined as the dissimilarity between the image content within a small window surrounding the pixel in the master image and the pixel in the slave image. The optimal disparity at point is finally estimated as the argument of the minimum matching cost. This procedure is commonly addressed as Winner-Takes-All (WTA). These techniques are described in more detail, for example, in R. Szeliski. "Computer Vision: Algorithms and Applications", Springer, 2010. Since stereo algorithms like BM rely on appearance similarity, disparity computation becomes challenging if more than one pixel in the slave image have the same local appearance, as all of these pixels may be similar to the same pixel in the master image, resulting in ambiguous disparity estimation. A typical situation in which this may occur is when visualizing a scene with constant brightness, such as a flat wall.

Methods exist that provide additional illumination by projecting a pattern that is designed to improve the performance of block matching algorithm that can capture small 3D details such as the one described in U.S. Pat. No. 9,392,262 "System and Method for 3D Reconstruction Using Multiple Multi-Channel Cameras," issued on Jul. 12, 2016, the entire disclosure of which is incorporated herein by reference. Another approach projects a pattern that is purely used to provide a texture to the scene and particularly improve the depth estimation of texture-less regions by disambiguating portions of the scene that would otherwise appear the same.

The projection source 106 according to embodiments of the present invention may be configured to emit visible light (e.g., light within the spectrum visible to humans and/or other animals) or invisible light (e.g., infrared light) toward the scene imaged by the cameras 102 and 104. In other words, the projection source may have an optical axis substantially parallel to the optical axes of the cameras 102 and 104 and may be configured to emit light in the direction of the fields of view of the cameras 102 and 104. An invisible light projection source may be better suited to for situations where the subjects are people (such as in a videoconferencing system) because invisible light would not interfere with the subject's ability to see, whereas a visible light projection source may shine uncomfortably into the subject's eyes or may undesirably affect the experience by adding patterns to the scene. Examples of systems that include invisible light projection sources are described, for example, in U.S. patent application Ser. No. 14/788,078 "Systems and Methods for Multi-Channel Imaging Based on Multiple Exposure Settings," filed in the United States Patent and Trademark Office on Jun. 30, 2015, the entire disclosure of which is herein incorporated by reference.

Active projection sources can also be classified as projecting static patterns, e.g., patterns that do not change over time, and dynamic patterns, e.g., patterns that do change over time. In both cases, one aspect of the pattern is the illumination level of the projected pattern. This may be relevant because it can influence the depth dynamic range of the depth camera system. For example, if the optical illumination is at a high level, then depth measurements can be made of distant objects (e.g., to overcome the diminishing of the optical illumination over the distance to the object, by a factor proportional to the inverse square of the distance) and under bright ambient light conditions. However, a high optical illumination level may cause saturation of parts of the scene that are close-up. On the other hand, a low optical illumination level can allow the measurement of close objects, but not distant objects.

FIG. 3A depicts master and slave images 302a and 304a captured while a scene is illuminated with high level of optical illumination and the resulting depth image 306a. FIG. 3B depicts master and slave images 302b and 304b while the scene is illuminated with a low level of optical illumination and the resulting depth image 306b. Comparing the depth images 306a and 306b, some portions of the high illumination level image 306a are saturated and detail regarding depth is lost, as shown by the outlined portions labeled "saturation." On the other hand, portions of the low illumination level image 306b corresponding to distant parts of the scene have no depth information because the illumination was insufficient to illuminate the area to a degree that was detectable by the cameras 102 and 104 (e.g., portions of the image were underexposed or below the noise threshold of the image sensor). These problems generally arise due to limitations in the dynamic range of the image sensors of the cameras: portions of the scene that are too bright or too dark after illumination by the active projection system, are not accurately captured by the cameras, and therefore are not accurately reconstructed in the depth map (e.g., depth maps 306a and 306b).

Active Projection Sources and the Dynamic Range Limitations of Image Sensors

For the sake of convenience, but without loss of generality, the below analysis assumes that the cameras in the depth camera system are global shutter cameras. In a global shutter camera, it is assumed that, for each image captured by the camera, all pixels in the image sensors of the cameras acquire scene luminance information during the same temporal interval. This is different from a rolling shutter camera, in which different rows of the sensor's pixel array integrate (or capture) light during different temporal intervals (e.g., on a row-by-row basis), although some embodiments of the present invention may use a rolling shutter camera.

With global shutter cameras, it is possible and simple to synchronize the illuminator with the exposure interval of the cameras so that it is possible to project an illumination pattern or texture during the exposure interval of all of the cameras sensors pixels. (In contrast, in a rolling shutter camera, it is possible that the illumination pattern is projected while only some of the pixels of the camera sensor are collecting light. In some embodiments of the present invention, the active projection source is controlled to emit light such that each of the pixels of the camera sensors captures light under substantially the same illumination conditions of the active projection source.) Thus, global shutter cameras can enable power saving by reducing the amount of time that the projection source is turned on and illuminating the scene. Light that is projected outside of an exposure interval is basically wasted, because the image sensors of the cameras are not active outside the exposure interval.

In some circumstances and in some embodiments, light is not projected during the whole exposure interval of duration T of the camera: the projection source may be active during a subinterval (a "projection interval") of duration $T_s \leq T$ of the exposure interval. If the irradiance (in units of W/m² where W is the radiance power in watts and m² is the area of the surface in square meters) received by a pixel from light from the projection source reflected by a surface is denoted by E, then the energy integrated over an exposure interval T is equal to $E \cdot A \cdot T_s$, where A is the illuminated pixel area.

Although a pixel receives light reflected from all light sources in the scene (such as ambient light), the light reflected from the projection source, in general, dominates the received irradiance from other light sources. For example, as seen in the master and slave images 302a and 304a in the case of high illumination level shown in FIG. 3A, the projected illumination information (the pattern projected by the projection source 106) dominates the texture of the acquired images. This is because, in some embodiments of the present invention, the light entering the cameras 102 and 104 passes through a narrowband optical filter that removes wavelengths outside the band of the illuminator's light.

For example, in one embodiment, the projection source 106 is configured to emit invisible light in the infrared portion of the spectrum, and the cameras 102 and 104 include optical filters that pass only light in a narrow portion of the infrared portion of the spectrum corresponding to the spectrum in which the projection source emits light (e.g., the "IR micro filter" shown in FIG. 2A). The projection source 106 may include, for example, an infrared laser or an infrared light emitting diode as a light source.

As such, in some embodiments of the present invention and in the following discussion, the effect of ambient light can be substantially neglected or ignored, and, in these embodiments, it can be assumed that the energy integrated during an exposure interval is due only from reflected light from the projection source. In addition, for the purposes of the immediately following discussion, it may be assumed that the projection source is on turned during the entire exposure period ($T_s=T$), so that the energy integrated over the exposure interval is equal to $E \cdot A \cdot T_S$.

Given the above assumptions, the brightness recorded for a given pixel in an image sensor can be approximated as a linear function of the brightness of the energy reflected by a surface E integrated during an exposure interval T over the area A of the of the pixel. The average number of electrons N generated during an exposure interval T is $N = k \cdot E \cdot A \cdot T/q$, where k is the quantum efficiency of the pixel and q is the charge of one electron. In the following discussion, without loss of generality, it is assumed that the quantum efficiency q is equal to 1. If N>C, where C is the quantum well capacity of the pixel, the pixel is said to be saturated. All saturated pixels output the same brightness value, regardless of the amount of energy that actually absorbed by the pixel in excess of the quantum well capacity. Therefore, saturation results in the loss of information due to the compromise of the textural quality of the image (saturated pixels all take on the same value of brightness).

The factors determining whether a pixel will saturated may include: the received irradiance E, which depends on the illumination level of the projection source; the distance of the reflecting surface; the angle of the reflecting surface to the projection source; the viewing angle and the albedo of the reflecting surface; the exposure interval T; the pixel area A; and the quantum well capacity C. Note that the last two factors are intrinsic characteristics of the camera, and that larger pixel area A generally results in larger quantum well capacity C.

The brightness noise at a non-saturated pixel that receives substantial light is generally due to photons (shot noise or Poisson noise). The variance of this noise is proportional to the integrated energy, e.g., $\sigma^2 \propto E \cdot A \cdot T \cdot q$. The Signal to Noise Ratio (SNR) at a non-saturated pixel is thus $(E \cdot A \cdot T)^2/(E \cdot A \cdot T \cdot q) = E \cdot A \cdot T/q$. As a result, pixels that receive lower irradiance (integrated energy) have lower SNR; the SNR of the pixels increases with increasing exposure interval T, so long as the pixels do not saturate; and the maximum SNR achievable by any pixel is equal to the quantum well capacity C, which is obtained when the pixel's brightness is close to saturation (N≈C).

Therefore, increasing the exposure time T to the maximum value achievable without any pixel becoming saturated can result in what will be referred to herein as "SNR-optimal exposure." However, a SNR-optimal exposure is not always ideal because a long shutter time can increase the likelihood of motion artifacts (such as motion blur) in situations in which the camera is moving or where objects in the scene are moving. In these situations, an exposure time T (or "shutter speed") can be chosen to be long enough to provide a sufficiently high SNR while being short enough to control (e.g., reduce) motion artifacts.

A SNR-optimal exposure ensures good signal-to-noise ratio for well-illuminated pixels, but darker pixels may still have an unsatisfactory SNR level. Considering the image of a scene, and let $E_{max}$ and $E_{min}$ be the maximum and minimum irradiances among the pixels in the image. In this case, we will define $SNR_{ill}$ as the signal to noise ratio of a well-lit or optimally-lit pixel:

$$SNR_{ill} = \frac{E_{max} \cdot A \cdot T}{q} \leq C$$

The "scene dynamic range" can then be defined as $SDR = E_{max}/E_{min}$; which can be expressed on a decibel (dB) scale as $20 * \log_{10}(E_{max}/E_{min})$. For example, for $E_{max}=86$ mJ/m² and $E_{min}=21$mJ/m² is about 14 dB. The darkest pixels (closest to $E_{min}$) will have a signal-to-noise ratio $SNR_{dark}$:

$$SNR_{dark} = E_{min} \cdot A \cdot T/q \leq C$$

However, under SNR optimal exposure, $SNR_{dark}$ is lower than C/SDR (at low illumination, readout and quantization noise become significant, adding to the existing photon noise). The larger the scene dynamic range SDR, the worse the SNR of the darker pixels. In addition, the camera dynamic range (CDR) can be defined as the largest scene dynamic range SDR such that, under SNR-optimal exposure, the darkest pixels have SNR larger than a threshold signal-to-noise ratio $SNR_0$. For example, $SNR_0$ may be chosen to be the SNR of a pixel whose brightness (at optimal SNR exposure) is quantized to the least significant bit, resulting in the CDR being approximately equal (when expressed in dB) to $6 \cdot N_B$, where $N_B$ is the number of quantization bits. In practice, $SNR_0$ is extremely low, and these pixels may fail to provide useful data.

High Dynamic Range Techniques

In the field of photography, methods for capturing representations of scenes having a dynamic range exceeding the dynamic range of the image sensor (or other photographic media) are generally referred to as high dynamic range (HDR) techniques. These techniques may operate by improving the signal-to-noise-ratio SNR for the darker pixels under high scene dynamic range, thus improving the effective camera dynamic range CDR.

Generally, these HDR techniques involve combining two or more images of the same scene using different exposure settings such as an exposure index (e.g., ISO or sensor signal gain), exposure interval (e.g., shutter speed), aperture (e.g., f-stop), and illumination level (e.g., guide number). For example, first and second images may be captured with respective exposure times $T_1$ and $T_2$ (with $T_2 = a \cdot T_1$, a>1, such that $T_2 > T_1$), where $T_1$ corresponds to the SNR-optimal exposure time so that the brightest pixels in the first image have values just below saturation. The first image of the scene that is captured with a shorter exposure time $T_1$ (and the same aperture and ISO) can bring the brighter portions of the scene into the dynamic range of the sensor and therefore resolve the detail in those portions, but will result in the dark portions of the scene being depicted as black and/or noise. The longer exposure time $T_2$ of the second image brings the dark portions of a scene into the dynamic range of the sensor, but this will likely result in saturating (or overexposing) portions of the image sensor capturing light from bright portions of the scene. In other words, the darkest pixels in the first image may have SNR lower than C/SDR. In the second image, which was captured with exposure time $T_2$, all pixels with irradiance larger than $E_{max}/a$ will be saturated; and all non-saturated pixels will have SNR that is at least a times larger than for the same pixels in the first image taken with exposure time $T_1$. The two or more images of the scene (or "image stack") can then be processed to obtain a combined image with an equivalent larger CDR that shows detail in both the dark and bright portions of the scene.

According to one method for combining the images, the set of pixels P that are saturated in the second image captured with exposure time $T_2$ are identified. All of the pixels in P are selected from the first image with exposure time $T_1$ and included in the output image. (For example, the pixels of P are identified by their coordinates in the second image and the pixels at those locations in the first image are selected for the output image). For all of the pixels not in P, the values of the pixels in the second image are included in the output image after being scaled by a factor of 1/a.

It is assumed that the first and second images are aligned (e.g., the locations of objects in the image have not changed between the first and second images), otherwise, motion between the two images may result in artifacts such as ghosting.

The equivalent CDR in the technique for combining images described above is equal to at least a times the CDR of the camera used to capture the image. However, other techniques may be used to combine images. For example, a pixel not in P may be assigned a value equal to the convex combination of the corresponding values in the first image (exposure time $T_1$) and the values in the second image (exposure time $T_2$) divided by a, where the weight for the value in the first image is proportional to the variance of the noise in the second image. This would result in the minimum variance estimator for the pixel value. In addition, dynamic compression techniques such as gamma compression or tone mapping are often used to avoid compromising the higher dynamic range when the same number of quantization bits is used.

The ratio a between the exposure of the first image and the second can be chosen in consideration of increasing the SNR of the darkest pixels while avoiding saturation of many of the pixels. One technique for setting the value of a is to choose the smallest value of a that ensures that, for a given scene, the darkest pixels have SNR greater than or equal to a minimum value $SNR_0$ used to define the CDR, in which case a=SDR/CDR. For example, if the SDR is 55 dB and $SNR_0$ is chosen to be the SNR of a pixel whose brightness is quantized to the least significant bit (resulting in a CDR value of 48 dB if brightness is quantized with $N_B$=8 bits, then a proper value for a would be 2.24. Another technique for setting the value of a is to choose a value such that the average SNR of the composite image is maximized.

While high dynamic range techniques were described above with respect to combining two images having different exposure times, these techniques can also use more than two images. For example, a set of images may have exposure times where the i-th image has exposure time $a_i$ T where $a_i$>1 can form an image stack and can be combined through extensions of the techniques described above.

However, applying high dynamic range techniques from standard photography to depth computation is not trivial, especially in the case of an active stereo vision depth camera system. For example, in the case of scenes with moving objects, the different images are captured at different times, which can result in ghosting effects (the same object being located in different places in different captures, thereby potentially causing, for example, the same object being located at multiple places in the resulting high dynamic range image). These effects can result in artifacts in the depth estimates because, for example, the multiple appearances of the same object in different places in the scene can cause the feature matching process to identify inconsistent locations, thereby resulting in errors in the disparity calculations that are used to generate the depth map.

High Depth Dynamic Range (HDDR)

Aspects of embodiments of the present invention relate to the use of high depth dynamic range (HDDR). HDDR, as used herein, refers to the use of high dynamic range techniques with depth camera systems.

In more detail, embodiments of the present invention relate to increasing the dynamic range of a depth camera system using an active light projection source. In an active depth camera system, it is possible control both the amount of light emitted by the active projection source and the exposure settings, such as the shutter speed, aperture, and ISO of the camera. This allows the generation of accurate depth maps of scenes having high dynamic range (e.g., exceeding the camera dynamic range) by capturing the scenes multiple times using different exposure settings and combining or synthesizing the images together when generating depth maps. While aspects of the present invention will be described below with respect to systems that include two cameras, embodiment of the present invention are not limited thereto.

Aspects of embodiments of the present invention will be described herein with respect to FIG. 1, which includes a first camera 102, a second camera 104, and a projection source 106 (or illumination source or active projection system) all controlled by a host processor 108 in accordance with instructions stored in a memory 110. However, embodiments of the present invention are not limited thereto and may be applicable to systems that include more than two cameras, multiple projection sources, and different control systems (such as a microcontroller, an application specific integrated circuit, a digital signal processor, or a field programmable gate array). As noted above, in the case of a two camera system, one of the cameras will be referred to as the "master" camera and the other camera will be referred to as the "slave" camera. The two cameras are assumed to be synchronized (e.g., controlled to capture images substantially simultaneously) and controlled to capture images using the same camera settings (e.g., exposure settings such as shutters speed, aperture, and gain, as well as global versus rolling shutter). In some embodiments the cameras are visible light (e.g., RGB color) cameras, and in other embodiments the cameras are invisible light (e.g., infrared) cameras.

In embodiments of the present invention, the projection source 106 is configured to emit light within a portion of the electromagnetic spectrum that can be captured by the camera system. For example, in embodiments in which the cameras are infrared cameras, the projection source 106 emits infrared light (e.g., wavelengths substantially in the range of about 820-980 nm). In embodiments in which the cameras are visible light cameras, the projection source emits visible light (e.g., "white" light substantially encompassing the visible spectrum in the wavelength range of approximately 350-780 nm). The emitted light may be non-collimated light or may be collimated light. In addition, the emitted light may be non-coherent light (e.g., as emitted by a light emitting diode) or may be coherent light (e.g., as emitted by a laser). In one embodiment, the projection source is a projection system that includes a laser emitter configured to emit coherent light that is collimated by a refractive optical element and diffracted by a diffractive optical element to generate a pattern. In another embodiment, the projection source 106 is a projection system including a laser emitting coherent light that is collimated by a diffractive optical element that collimates the light and generates a pattern (see, e.g., U.S. patent application Ser. No. 14/743,738 "Systems and Methods for Reducing Z-Thickness and Zero-Order Effects in Depth Cameras," filed in the United States Patent and Trademark Office on Jun. 18, 2015, the entire disclosure of which is incorporated herein by reference). In some embodiments of the present invention, the projection source includes only one source of light (e.g., one light emitting diode or one laser diode) or may include multiple sources of light (e.g., a one-dimensional or two-dimensional array of light emitting diodes or a one-dimensional or two-dimensional array of laser diodes)

that can be controlled to all emit light at the same time, or that can be controlled to emit light independently (e.g., one at a time or in controllable combinations of the multiple sources of light). In one embodiment of the present invention, the pattern of the light that is projected by the projection system is constant.

Figure 4A:
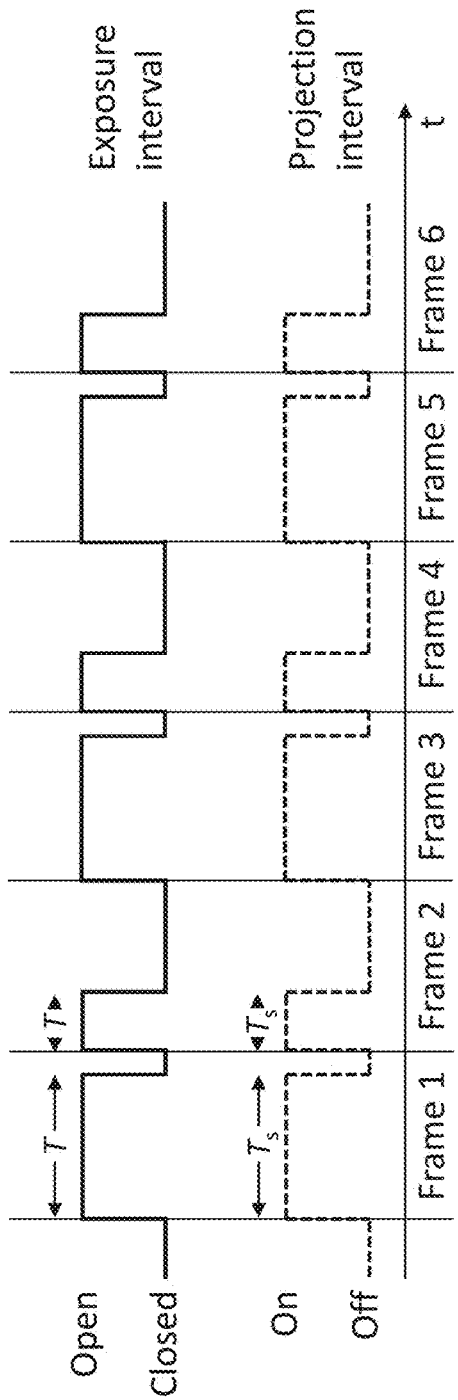
FIGS. 4A and 4B are timing diagrams illustrating the projection intervals of light emitted by a projection system during the capture of a plurality of frames captured by the depth camera system according to some embodiments of the present invention.
Figure 4B:
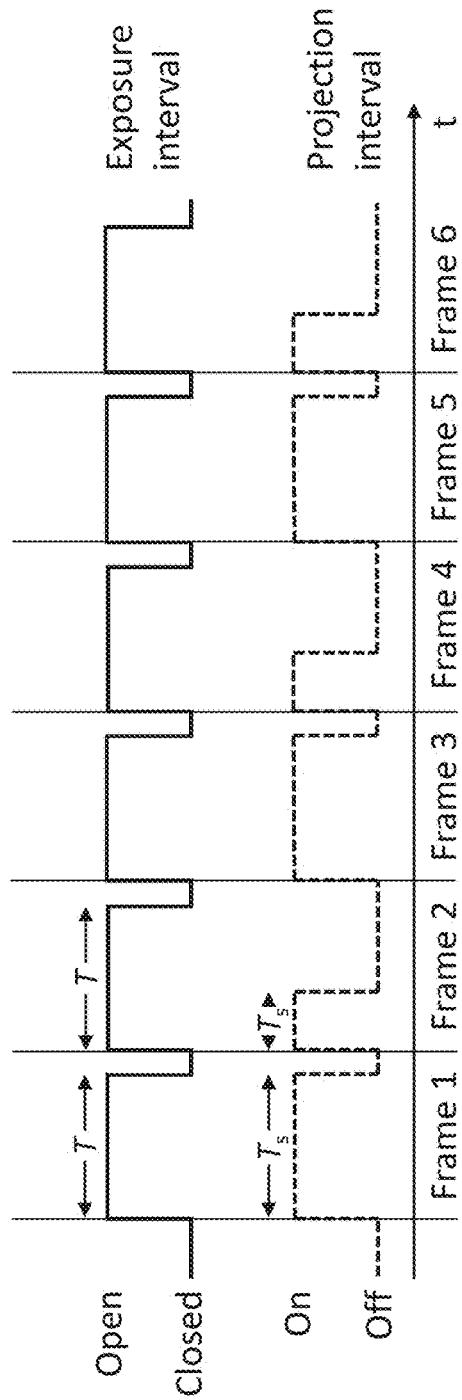

FIGS. 4A and 4B are timing diagrams illustrating the projection intervals of light emitted by a projection system 106 during the capture of a plurality of frames captured by the depth camera system 100 according to some embodiments of the present invention. Each frame I includes an n-tuple of images, where each image is captured by one of the n cameras of the depth camera system 100. For the sake of convenience, embodiments of the present invention are described with respect to a two camera system (n=2), but embodiments of the present invention are not limited thereto. In this case, a frame I includes two images: the image M acquired by the master camera and the image S acquired by the slave camera. During any one frame I, each of the cameras is assumed to be controlled to use substantially the same settings (e.g., same exposure interval, aperture, and gain), and the projection source is assumed to project a pattern that, all else being equal, is equally detectable by all cameras (noting that the environment may cause the pattern to be more easily detectable by some cameras than by other cameras).

In more detail, FIGS. 4A and 4B show the capture of six frames (Frame 1, Frame 2, Frame 3, Frame 4, Frame 5, and Frame 6 or ($I^1, I^2, I^3, I^4, I^5, I^6$)) over time t, where the vertical lines indicate the boundaries in time of each frame (e.g., the start of a frame is indicated by the vertical line to its right, and the end of a frame is indicated by the vertical line to its right). The frames may be captured at a variety of frame rates, such as 10 frames per second to 60 frames per second (or even more, such as 240 frames per second). In some embodiments, the frame rate is 30 frames per second, where, generally, a higher frame rate reduces artifacts arising from motion between frames. The exposure interval of the image sensor is shown with a thick solid line, where a high value indicates that the shutter is open (e.g., that the image sensor is capturing light) and a low value indicates that the shutter is closed (e.g., that the image sensor has stopped capturing light). Similarly, the emission interval of the projection system 106 is shown with a thick dotted line, where a high value indicates that the projection system 106 is turned on (e.g., emitting light), and a low value indicates that the projection system 106 is turned off (e.g., not emitting light). In the embodiments shown in FIGS. 4A and 4B, the power of the projection system 106, when it is turned on, is constant.

FIG. 4A illustrates a synchronized approach, in which the exposure interval T is synchronized with the projection interval $T_s$ of the projection source (e.g., $T=T_s$ during the frame). FIG. 4B illustrates a decoupled approach, in which the exposure interval T is decoupled from the projection interval $T_s$ (e.g., $T \geq T_s$ during the frame) such that the projection source 106 is turned on only during a subinterval $T_s$ of the exposure interval T.

As discussed above, during an exposure period T, the energy accumulated at a pixel is equal to $E \cdot A \cdot T_s$, where A is the illuminated pixel area and where E is the irradiance received by a pixel from light from the projection source 106 reflected by a surface (e.g., in units of W/m$^2$). Thus, by modulating the length of the projection interval $T_s$, in the decoupled approach, it is possible to change the energy accumulated at a pixel during one frame independently of the length of the exposure interval T, which may be kept fixed or constant across the various frames. This system is functionally equivalent to an HDR system that modulates the length of the exposure interval T, but keeps the exposure interval T fixed. Similarly, in the synchronized approach, although the length of the exposure interval T may vary, the projection time still modulates. In the absence of ambient light effect on the latter case, in both of these circumstances, the signal to noise ratio (SNR) at a well-lit but not-saturated pixel is approximately equal to $E \cdot A \cdot T_s/q$.

FIGS. 5A and 5B are timing diagrams illustrating the power of light emitted by a projection system 106 during the capture of a plurality of frames captured by the depth camera system 100 according to some embodiments of the present invention. In the embodiment shown in FIG. 5A, rather than changing the length of the projection interval $T_s$, the amount of illumination provided by the projection source 106 is controlled by modifying or modulating the output illumination power P of the projection source 106, as shown along the vertical axis of FIG. 5A. For example, in the case of a projection system 106 using a laser, there is a nominal current $I_0$ at which the laser generates maximum optical power $P_{max}$. With driving current higher or lower than this nominal current $I_0$, the laser is characterized by a lower optical efficiency, leading to lower emitted optical power, thereby allowing the control of the optical power of the projection source 106.

FIG. 5A shows a synchronized approach in which the exposure interval T is synchronized with the projection interval $T_s$. However, in contrast to the synchronized approach shown in FIG. 4A, the exposure interval T and the projection interval $T_s$ both remain fixed and the same from frame-to-frame, and the amount of illumination provided to the scene by the projection source 106 is controlled by changing the output power P of the projection source 106 (as indicated along the vertical axis of FIG. 5A), where $P \leq P_{max}$.

FIG. 5B shows an embodiment of the present invention in which both the projection interval $T_s$ and the output power P may be varied from frame to frame, where $Ts \leq T$ and $P \leq P_{Pmax}$, thereby providing two dimensions of control over the total energy output by the projection source 106 during each frame.

As noted above, this description assumes that the irradiance E at a pixel is due solely to the reflection of light emitted by the projection source 106. Specifically, the irradiance E at a pixel is assumed to be a linear function of the radiant power of the light emitted by the projection source 106. However, embodiments of the present invention are not limited thereto and can also be applied to circumstances in which the irradiance E also includes contribution from ambient light or environmental light sources (e.g., daylight, artificial lighting within the scene, heaters, and the like).

Based on this assumption, $E_{max}$ may be defined as the irradiance at a specific pixel when the output power P of the projection source 106 is at its maximum $P_{max}$. If the radiant light power from the projection source 106 is reduced by a factor $\alpha$ with respect to the maximum radiant light power $P_{max}$, the irradiance E at the same pixel is also reduced by the same factor $\alpha$. The energy accumulated at that pixel during an exposure interval (or integration interval) is therefore $E_{max} \cdot A \cdot T_s/\alpha$ This is functionally equivalent to what would be obtained by a system using the maximum projector power, but with exposure time reduced to $T_s/\alpha$. In this embodiment, signal to noise ratio at a well-lit but not saturated pixel is approximately equal to $E_{max} \cdot A \cdot T_{s/(\alpha \cdot q)}$.

As such, embodiments of the present invention can capture images for high dynamic range imaging while keeping the exposure time T fixed. This is achieved, in party by modulating both the exposure and the projected illumination level, where the projected illumination level can be modulated by varying the projection interval $T_s$, by varying the optical output power of the projection source, by varying the number of projection sources that are emitting light during an exposure interval, and combinations thereof. Therefore, embodiments of the present invention enable the benefits of capturing images with high signal to noise ratio across a scene to generate a high dynamic range capture, in addition to maintaining a constant exposure time between individual captures. This can be contrasted with high dynamic range approaches that merely vary exposure time in different frames.

Maintaining a fixed exposure time across a number of images captured by the depth camera system allows for analysis of motion blur (e.g., the motion of objects in the scene or the field of view of the depth camera system during a capture of an image) and computation of the relationship of the motion blur to the speed of targets in the scene.

In another embodiment of the present invention, the depth camera system 100 is configured to project multiple different patterns of light with different density projected onto the scene. In various embodiments, the various patterns project the same total projector power P onto the scene in different ways, such as fewer and brighter dots, or a brighter pattern over a smaller solid angle. The dot pattern density (or average number of dots projected onto a unit square area of a flat area of the scene or a unit solid angle of the scene) can be increased to get better x-y depth resolution (e.g., finer detail regarding the edges of objects in the scene), or can be decreased to pack more photon energy per dot (all other factors being equal, such as projection power P) In addition, the shape of the pattern may change, such as dots, lines, stripes, and the like. In some embodiments of the present invention, the projection source includes multiple light emitting elements (e.g., multiple laser diodes or multiple light emitting diodes), and different patterns are generated by selectively emitting light from different ones or different combinations of the multiple light sources. In still other embodiments of the present invention the depth camera system 100 includes multiple projection sources, where the different projection sources may be configured to project different patterns onto the scene. In addition these patterns may be emitted concurrently, individually, and in various combinations thereof.

When using multiple different patterns, a pixel will receive a level of irradiance that depends on which pattern or patterns are activated during the exposure interval, the output power (or output powers) of the projection sources emitting the pattern (or patterns), as well as the geometry (e.g., the physical relationship) of the projection sources, the cameras, and the surfaces of the scene. For example, two different patterns may be generated with the same power (e.g., the same amount of power supplied to the projection source), but one pattern may concentrate the energy into a smaller area (e.g., solid angle) than the other pattern. As a more specific example, the patterns may be patterns of dots, and one pattern may include fewer and brighter dots than the other pattern. As another example, as discussed above, the projection power falls off at a rate proportional to the inverse square of the distance to the surface. As a result, a pixel imaging a more distant portion of the scene will generally receive a lower level of irradiance than a pixel imaging a similarly illuminated, but closer, portion of the scene.

In another embodiment of the present invention, the processor 108 is configured to vary the combination of exposure settings between frames. These settings may include, for example, the exposure interval, aperture, and sensor gain of the cameras, as well as the amount of light emitted by the projection system (e.g., the projection interval and/or the projection power). As one example, the exposure interval may vary at a low frequency (e.g., once every 10 frames). This may be useful for including frames of data that capture the features of dark, but relatively still, background portions of the scene at a low frequency, while continuing to capture the brightly light, but faster moving, foreground portions of the scene at a high frame rate.

Varying the exposure time of the image sensor can require performing the complex task of programming the image signal processor controlling the sensor with a new set of capture parameters. In some circumstances, a frame may be lost before the sensor settings are settled. On the other hand, controlling the duration or output power of a projection source 106 can easily be performed by controlling the driver of the projection source. According to one embodiment of the present invention, "micro-scripts" executed by an image signal processor of the image sensor may be used to control the sensor settings in accordance with a particular sequence of different capture parameters, as described, for example, in U.S. patent application Ser. No. 14/788,078 "Systems and Methods for Multi-Channel Imaging Based on Multiple Exposure Settings," filed in the United States Patent and Trademark Office on Jun. 30, 2015, the entire disclosure of which is incorporated by reference herein.

For the sake of convenience in the below discussion, captured images will be referred to as "dark frames" and "bright frames." The term "dark frame" will be used herein to refer to a frame in which the optical illumination level of the projection source 106 is low. This low illumination level may be achieved by a short projection interval $T_s$, by a low projected optical power P, by a particular projection pattern, or by combinations thereof. These dark frames will be represented by the symbol $I_d$. The term "bright frame" will be used herein to refer to a frame in which the optical illumination level of the projection source 106 is high. This high optical illumination level may be achieved by a long projection interval $T_s$, by a high projected optical power P, by a particular projection pattern, or by combinations thereof. These bright frames will be represented by the symbol $I_b$.

While the below discussion will describe embodiments using two types of frames—dark frames $I_d$ and bright frames $I_b$—embodiments of the present invention are not limited to capturing images at merely two different exposure levels. In some embodiments of the present invention, there are more than two different types of frames. For example, the images are captured at a dark exposure level, a bright exposure level, and one or more intermediate exposure levels between the dark and bright exposure levels. This may be achieved by controlling the projection source to emit light at a low illumination level, a high illumination level, and one or more intermediate illumination levels between the low illumination level and the high illumination level.

Figure 6B:
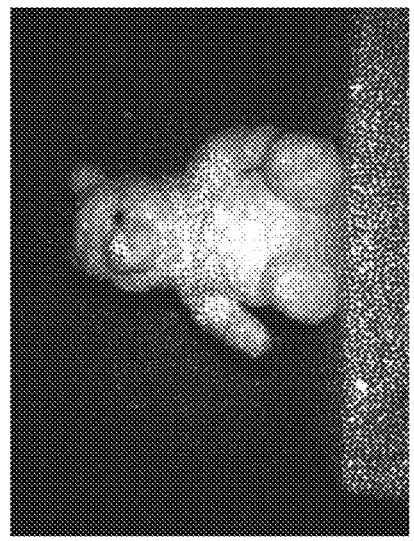
FIG. 6A is an example of a dark frame $I_d$ and FIG. 6B is an example of a bright frame $I_b$ according to one embodiment of the present invention.
Figure 6A:
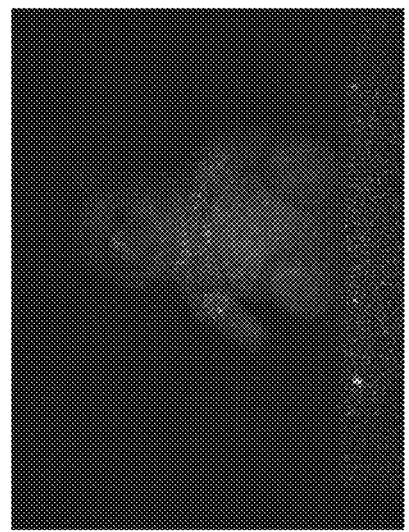

FIG. 6A is an example of a dark frame $I_d$ and FIG. 6B is an example of a bright frame $I_b$ according to one embodiment of the present invention.

For both dark frames $I_d$ and bright frames $I_b$, the exposure interval T is assumed to be constant and has a length that is greater than or equal to that of the projection interval $T_s$ ($T \geq T_s$). Consecutive frames I during the acquisition of images of a scene may be represented by the notation $I^0, I^1, \ldots I^{t-1}, I^t, \ldots$, where the superscript indicates the position of the frame in the sequence. In addition, subscripts can be used to identify whether the frames are dark frames $I_d$ or bright frames $I_b$. For example, in the case where the processor 108 controls the projection source 106 and the cameras 102 and 104 to alternate between capturing dark frames $I_d$ and bright frames $I_b$ on a frame-by-frame basis, consecutive frames may be represented as: $I_d^0$, $I_b^1$, $I_d^2$, $I_b^3$, . . . .

The above discussed notation for describing a sequence of frames can also be applied to the images M and S of a frame I. For example, the above alternating sequence of dark frames $I_d$ and bright frames $I_b$ is made up of alternating dark and bright images acquired by the master camera $M_d^0$, $M_b^1$, $M_d^2$, $M_b^3$ . . . and alternating dark and bright images acquired by the slave camera $S_d^0$, $S_b^1$, $S_d^2$, $S_b^3$, . . . .

The bright and dark image frames $I_b$ and $I_d$ also correspond to a sequence of patterns P projected by the projection system 106, such as: $P_d^0$, $P_b^1$, $P_d^2$, $P_b^3$, . . . "Dark" patterns $P_d^i$, may correspond to, for example, a shorter projection interval $T_s$ or a lower projected illumination level than "bright" patterns $P_b^j$.

Figure 7A:
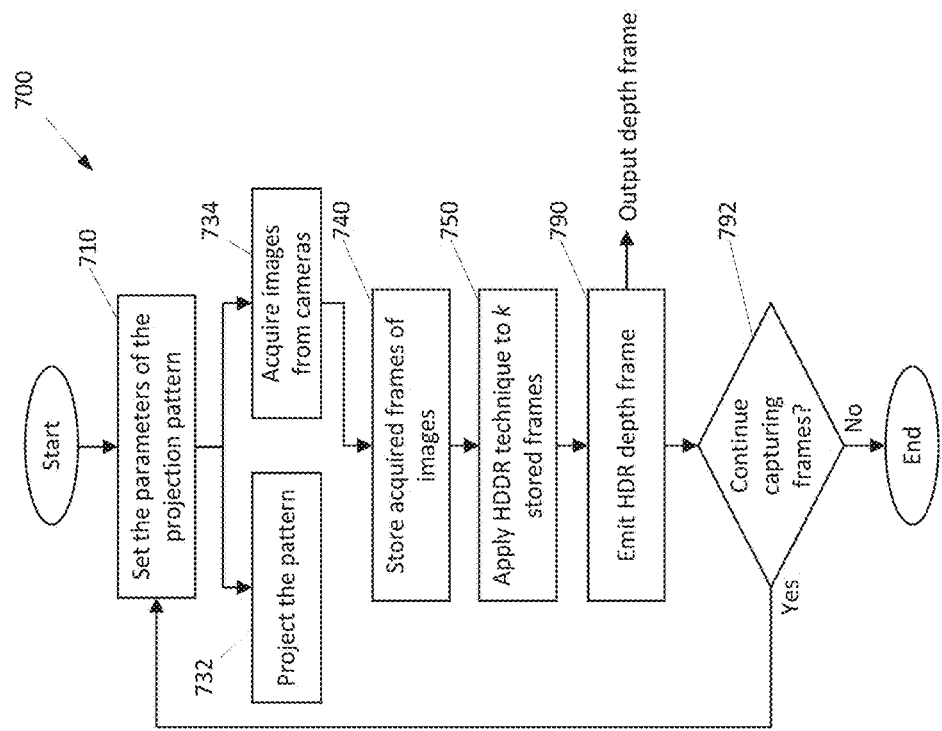
FIG. 7A is a flowchart of a method for controlling a projection source and capturing a plurality of frames according to one embodiment of the present invention.

FIG. 7A is a flowchart of a method 700 for controlling a projection source and capturing a plurality of frames according to one embodiment of the present invention. As shown in FIG. 7A, in operation 710, the processor 108 sets the parameters of the projection pattern in accordance with one or more rules. These rules may be, for example to alternate between dark patterns $P_d^i$, and bright patterns $P_b^j$. In operation 732, the processor 108 controls the projection source 106 to project the pattern in accordance with the parameters set in operation 710. As discussed above, the energy of a bright or of a dark pattern can be modulated by changing the projection interval, changing the power of the projected light, by changing the pattern being projected, or by a combination thereof.

In operation 734, the processor 108 also controls the cameras 102 and 104 to acquire images concurrently with the projection of the pattern, such that the cameras acquire light from the projected patterns as reflected by the scene. In operation 740, the processor 108 stores the images acquired from the cameras, for example, in memory 110.

In operation 780, a high depth dynamic range technique is applied to a plurality of previously stored images (e.g., k stored images). These previously stored images may include the images that were most recently captured, in addition to images captured during previous iterations. Embodiments of HDDR techniques will be described in more detail below with respect to FIGS. 8, 9, 10, and 11. In operation 790, the depth map or depth frame generated in operation 780 is output (e.g., stored in the memory 110 or transmitted via the network adapter 116 or other communication interface). In operation 792, the processor 108 determines whether to continue capturing frames. For example, the capture of frames may be controlled via a software control or based on a set number of depth frames to be captured. If the capture of frames is to continue, then the process returns to operation 710 to set the parameters of the projection patterns to new settings (e.g., if a dark pattern was emitted during the previous iteration, then the parameters may be set to emit a bright pattern). If the capture of frames is to end, then the process is complete.

In one embodiment, bright and dark patterns $P_b$ and $P_d$ are projected alternatingly and the energy of the bright and of the dark patterns P is fixed a-priori, such that, in operation 710, the processor alternates between setting the parameters of the projection pattern to project a bright pattern $P_b$ and a dark pattern $P_d$.

Figure 7B:
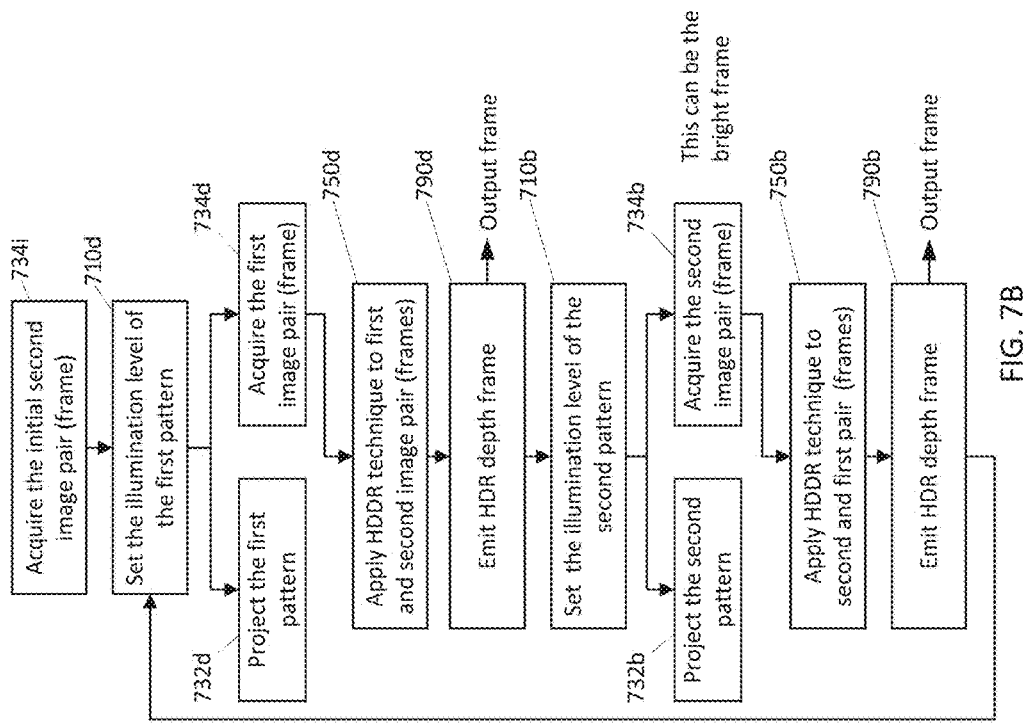
FIG. 7B is a flowchart illustrating a method for controlling a projection source to alternating project bright and dark patterns $P_b$ and $P_d$ and capturing a plurality of frames according to one embodiment of the present invention.

FIG. 7B is a flowchart illustrating a method for controlling a projection source to alternating project bright and dark patterns $P_b$ and $P_d$ and capturing a plurality of frames according to one embodiment of the present invention. For the sake of convenience, operations in FIG. 7B that are similar to those of the method of FIG. 7A will be labeled with similar reference numerals. In addition, for the sake of convenience, FIG. 7B will be described with respect to a camera system that includes a pair of cameras (two cameras).

Referring to FIG. 7B, in operation 734i, an initial image pair" may be acquired by controlling the pair of cameras to capture respective images. In operation 710d, the processor 108 sets the energy of the first pattern to, for example, the energy of a dark pattern $P_d$. In operation 732d, the processor 108 controls the projection source 106 to project the pattern in accordance with the dark pattern $P_d$, and controls the pair of cameras to acquire a "first image pair" concurrently with the projection of the first pattern. Because the first image pair was captured while the dark pattern $P_d$ was emitted by the projection source 106, the first image pair may be a dark image frame $I_d$ (e.g., including dark master and dark slave images $M_d$ and $S_d$). In operation 780, an HDDR technique can be applied to the first and second image pairs (e.g., the initial "second image pair" acquired in operation 734i) to generate an output depth frame, which is output in operation 790d.

In operation 710b, the processor 108 sets the energy of the second pattern to, for example, the energy of a bright pattern $P_b$. As above, in operation 732b, the processor 108 controls the projection source 106 to project the pattern in accordance with the bright pattern $P_b$, and controls the pair of cameras to acquire a "second image pair" concurrently with the projection of the first pattern. Because the second image pair was captured while the bright pattern $P_b$ was emitted by the projection source 106, the second image pair may be a bright image frame $I_b$ (e.g., including bright master and dark slave images $M_b$ and $S_b$). In operation 780b, an HDDR technique is applied to the first image pair (e.g., the dark image pair acquired in operation 734d) and the second image pair (e.g., the bright image pair acquired in operation 734b) to generate another output depth frame, which is output in operation 790b.

The process of FIG. 7B may then continue with operation 710d, as described above to set the projection source to emit the dark pattern $P_d$ again. In operation 780d, the second image pair that was captured earlier in operation 734b may be used instead of the image pair captured in operation 734i.

Controlling the Illumination Level

Various aspects embodiments of the present invention are directed to setting the energy of the projection patterns P in a variety of different ways.

In one embodiment, the energy of the dark patterns $P_d$ is determined a priori, while the energy of the bright patterns $P_b$ is set to a value a times larger than the value of $P_d$, where the factor a is set to a fixed value is determined empirically (e.g., depending on the dynamic range of the image sensors 102a and 104a of the cameras 102 and 104).

In another embodiment, the energy of the dark pattern $P_d$ is set to the largest value such that few or no pixels are saturated. This would ensure that the brighter pixels in the scene receive sufficiently high irradiance and thus have high SNR. Although the darker pixels will have low SNR in the dark frame $I_d$, the SNR of the darker pixels will be increased in the subsequent bright frame $I_b$.

In another embodiment, the factor a that is the ratio between the energy of a bright pattern $P_b$ and of a dark pattern $P_d$ is determined based on expected characteristics of the scene. For example, the camera system may store a plurality of presets based on minimum and maximum distances from the projector ($d_{min}$ and $d_{max}$) of any surfaces in the scene, minimum and maximum albedo ($\rho_{min}$ and $\rho_{max}$) of the surfaces, and of the maximum angle ($\theta_{max}$) between the normal of a surface at any given point and the line joining that point with the projection source 106 (noting that the minimum such angle can be safely assumed to be 0°). In addition, the presets may also take into account the minimum and the maximum value ($P_{min}$ and $P_{max}$) of the radiant intensity (power irradiated per unit solid angle) projected by the projection source 106 for a dark frame. The scene dynamic range (SDR), which is defined as the ratio between the irradiance at the brightest and at the darkest pixel in the image, can take a value as large as $SDR_{max} = (P_{max} \cdot \rho_{max} \cdot d_{min}^2)/(P_{min} \cdot \rho_{min} \cdot \cos(\theta_{max}) \cdot d_{max}^2)$.

Given the above conditions, a value for the factor a can be calculated for each preset by considering that, by combining a dark and a bright image, the effective camera dynamic range (CDR) increases by at least the same factor a. If the camera dynamic range (CDR), which represents the largest SDR such that the darkest pixel in the image has SNR largest than a threshold $SNR_0$, is known, then the value for the factor a can be chosen to be equal to the ratio between $SDR_{max}$ and the camera's CDR. The CDR of a camera is generally an intrinsic property of the image sensor and therefore can be known or measured at the time of design of the system.

As such, according to one embodiment of the present invention, one of the stored presets may be selected to set the factor a. The selection from among the stored presets may be made manually from a user preference or image mode to the processor. The selection may also be made automatically by the depth camera system 100 during an initialization process, in which the processor 108 is configured to capture a plurality of images of the scene illuminated by the projection source 106 emitting light at a plurality of illumination levels to, for example, estimate the distances to objects in the scene and to estimate the albedo of the surfaces.

In yet another embodiment, instead of computing the upper bound of the scene dynamic range $SDR_{max}$ using the minimum radiant intensity $P_{min}$ of the projection source 106, a larger value, such as, the median value $P_{med}$ of the radiant intensity distribution. may be used instead. The equivalent upper bound for the scene SDR is defined by $SDR_{max-eq} = (P_{max} \cdot \rho_{max} \cdot d_{min}^2)/(P_{med} \cdot \rho_{min} \cdot \cos(\theta_{max}) \cdot d_{max}^2)$, and this value could be used in combination with the camera CDR to obtain a proper value for a, as explained above. This choice would allow one to take into consideration the fact that the darkest areas of the pattern may have extremely low radiant intensity, resulting in very low SNR values even for the projected pattern has high energy.

In another embodiment, the brightness value $B^t = B(P^t)$ of a projected pattern $P^t$ is obtained by analyzing the brightness value of the previously projected pattern $B^{t-1} = B(P^{t-1})$ and the images acquired for such pattern ($M^{t-1}$ for the master image and $S^{t-1}$ for the slave image). This procedure can be extended to the brightness of multiple previous projected patterns $B^{t-i} = B(P^{t-i})$, $i=1, \ldots, n$ and to the corresponding images acquired by the master and the slave camera when projecting these patterns: respectively $M^{t-i}$, $i=1, \ldots, n$ and $S^{t-i}$, $i=1, \ldots, n$.

Figure 7C:
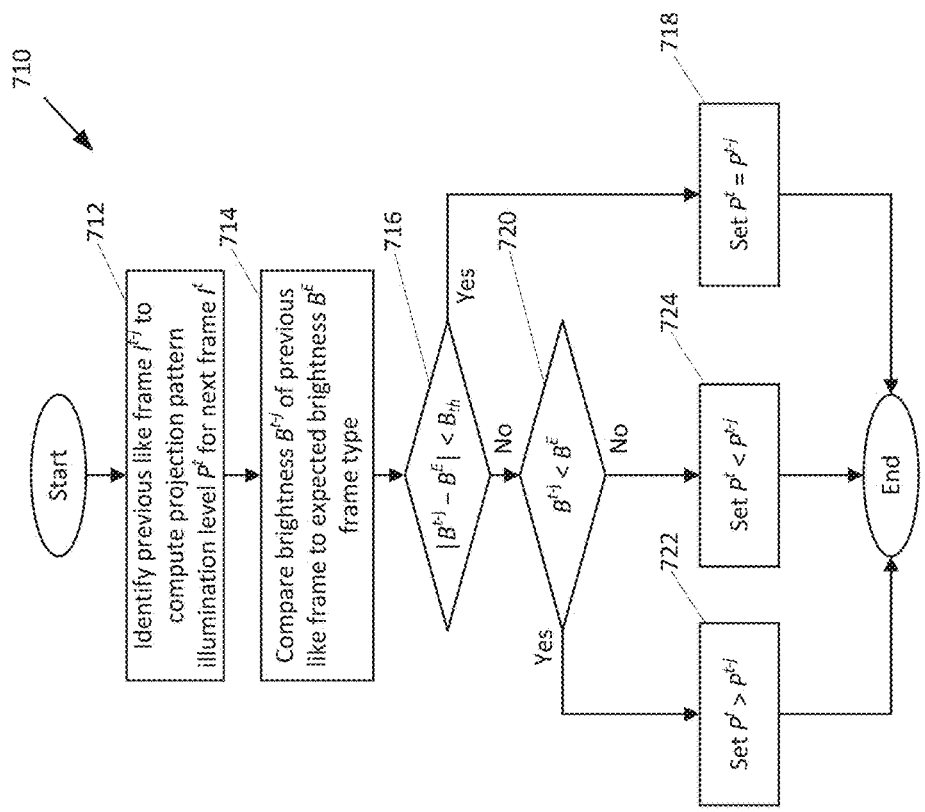
FIG. 7C is a flowchart of a method for controlling the output illumination level of a projection source in accordance with brightness measurements of previous frames according to one embodiment of the present invention.

FIG. 7C is a flowchart of a method 710 for controlling the illumination level of a projection source in accordance with brightness measurements of previous frames according to one embodiment of the present invention.

To calculate an illumination level for the current projection $P^t$, in operation 712, the processor 108 identifies a previous frame that was captured that was of the same type as frame t. This "type" may refer to, for example, a dark frame $I_d$, a bright frame $I_b$, or other types of frames (e.g., having an exposure between a dark frame $I_d$ and a bright frame $I_b$).

For example, suppose that the depth camera system 100 is configured to alternate between capturing dark images and bright images by alternating between a dark projection pattern $P_d$ and a bright projection pattern $P_b$ (e.g., $P_d$, $P_b$, $P_d$, $P_b$, ... ), that the brightness values $B^{t-2}$, $B^{t-1}$ of the projected patterns $P^{t-2}$, $P^{t-1}$, respectively, are known, and the processor is to compute the brightness value $B^t$ for the pattern $P^t$ to be projected when capturing the t-th frame $I^t$. Because the system is configured to alternate between dark and bright patterns, for the sake of the example, $P^{t-2}$ is assumed to be a dark pattern, $P^{t-1}$ is assumed to be a bright pattern, and $P^t$ will be a dark pattern again. Therefore, in this example the previous frame that was of the same type as the next frame or t-th frame $I^t$ was the t−2-th frame $I^{t-2}$ (e.g., j=2), and therefore the illumination level of the next projection pattern $P^t$ is computed in accordance with information about the previous like frame $I^{t-2}$.

Moreover, the processor 108 has access to a model (e.g., a model stored in the memory 110) that relates the brightness of the images captured during frames to the expected or target brightness $B^E$ of the corresponding type of frame. For example, if frame $I^{t-2}$ was a dark frame, then the images of that frame (e.g., master image $M^{t-2}$ and slave image $S^{t-2}$) are compared to models of expected brightness $B_d^E$ of a dark frame. For example, a dark frame is expected to have substantially no saturated pixels in its images. As another example, if frame $I^{t-1}$ was a bright frame, then the images of that frame (e.g., master image $M^{t-1}$ and slave image $S^{t-1}$) are compared to models of expected brightness $B_b^E$ of a bright frame. For example, a bright frame is expected to have substantially no pixels underexposed pixels (e.g., pixels below the noise threshold of the image sensor or no pixels below $SNR_0$).

In embodiments of the present invention that include intermediate types of images, a brightness model may expect that, in an intermediate image, at least some pixels are underexposed and at least some pixels are saturated.

In operation 714, the processor 108 compares the brightness of the images captured in the previous like frame to the brightness model. The processor then sets the parameters of the projection pattern in accordance with the results of the comparison. For example, in operation 716, the processor 108 determines if the difference in brightness $B^{t-j}$ of the previous like frame from the expected brightness $B^E$ is less than a threshold level of difference $B_{th}$ from the expected brightness of that frame ($|B^{t-j} - B^E| < B_{th}$). If so, then in operation 718, the parameters of the projection pattern $P^t$ are set to be the same those of the previous like frame $P^{t-j}$. If not, then in operation 720 the processor 108 determines whether the previous like frame is darker than the expected brightness ($B^{t-j} < B^E$). If so, then in operation 722 the parameters of the projection pattern $P^t$ are set to increase the exposure (e.g., set so that $P^t > P^{t-j}$ by increasing the length of the exposure interval, increasing the projection output power, changing the projection pattern, and combinations thereof). If not, then the previous frame is brighter than the expected brightness, so in operation 724 the parameters of the projection pattern $P^t$ are set to decrease the exposure (e.g., set so that $P^t < P^{t-j}$ by decreasing the length of the exposure interval, decreasing the projection output power, changing the projection pattern, and combinations thereof). In various embodiments of the present invention, the magnitude of the change in exposure (e.g., number of exposure value in "stops") can be calculated in various ways. In one embodiment, the host processor 108 applies a regression analysis on the brightness and power pairs (B,P) at multiple previous frames to identify a relationship between brightness B and projector power P and to compute a new projector power for the current frame that will achieve the desired brightness (e.g., in the case of alternating bright and dark frames, the previous three like frames ($I^{t-2}, I^{t-4}, I^{t-6}$) may be included in the regression analysis). In other embodiments of the present invention, the magnitude of the change may be a set amount (e.g., ⅓ exposure value or a factor of about 1.26).

In the below, more specific example, the computation of a projection patterns $P^t$ for a t-th frame is based on previous frames $I^{t-2}, I^{t-1}$, which include master and slave images $M^{t-2}$, $M^{t-1}, S^{t-2}, S^{t-1}$ which are captured when projecting the corresponding patterns $P^{t-2}, P^{t-1}$, and where dark frames alternate with bright frames. Assuming that $P^t$ is to be dark pattern $P_d^t$ when computing the illumination level of $P^t$, if the brightness of the previous dark frame $I^{t-2}$ is too bright (e.g., there are many saturated pixels in $M^{t-2}$ and in $S^{t-2}$), then the processor 108 of the depth camera system 100 may reduce the illumination level of the projected pattern of $P^t$, such that $P^t < P^{t-2}$ to attempt reduce the number of pixels that are saturated in $M^t$ and in $S^t$. On the other hand, if the previous dark frame $I^{t-2}$ is too dark (e.g., a significant portion of the brightest pixels are significantly below saturation, as measured by a threshold), then the processor 108 of the depth camera system 100 may increase the illumination level of the projected pattern of $P^t$, such that $P^t > P^{t-2}$ to attempt increase the number of the brightest pixels that are close to saturation in $M^t$ and in $S^t$, thereby using a wider portion of the dynamic range of the camera CDR.

Similarly, in the case where $P^t$ is to be a bright pattern $P_b^t$, and $P_b^{t-2}$ was the previous bright pattern ($P^{t-1}$ was a dark pattern in this example), then, when computing the illumination level of the pattern to be output during the capture of the t-th frame $I^t$, the processor 108 of the depth camera system 100 identifies whether the previously captured bright frame $I^{t-2}$ contained many pixels that were below the noise threshold of the camera. If so, then the processor may increase the output illumination level of the projected pattern $P^t$, such that $P^t < P^{t-2}$ to increase the number of pixels that capture information about the scene in $M^t$ and in $S^t$. On the other hand, if the previous bright frame $I^{t-2}$ is too bright (e.g., a significant portion of the darkest pixels are significantly above the noise floor of the image sensor, as measured by a threshold), then the processor of the depth camera system may decrease the output illumination level of the projected pattern $P^t$ such that $P^t > P^{t-2}$, thereby increasing the number of dark pixels that are close to the noise floor of the sensor, in order to use a wider portion of the dynamic range of the camera CDR.

In the embodiment shown in FIG. 7B, it is assumed that dark and light frames alternate, as shown above. However, embodiments of the present invention are not limited thereto. As one example discussed above, the exposure level may vary at a low frequency, such as one bright frame for every ten frames, with nine dark frames in between the bright frames (this may be useful for including frames of data that capture the features of dark, but relatively still, background portions of the scene at a low frequency, while continuing to capture the brightly light, but faster moving, foreground portions of the scene at a high frame rate). Reducing the frequency of bright frames reduces the amount of energy used by the projection system 106, thereby reducing power consumption. In addition, a reduced overall frame rate can reduce power consumption in terms of processing captured images and/or transmitting the captured images for remote (e.g., cloud) processing. Reduced power consumption may be of concern in a variety of situations, such as battery powered electronic devices, devices with low wattage power supplies, and devices that are designed for low standby power consumption. In some circumstances, a low power device, such as a battery powered mobile device, operates in a standby or semi-sleep mode in which the user is not actively using the mobile device. In this standby mode, the mobile device can operate the image capture system 100 at a low frame rate to conserve energy while maintaining the ability to detect conditions that trigger the mobile device to "wake-up" into an active mode. Examples of conditions include a change in brightness or other change, motion following a particular path within a range of distances (e.g., a wake-up gesture in a range of 1 inch to 12 inches), and the like.

As another example, the types of frames may vary in accordance with the dynamic range of the scene. As discussed above, in some circumstances, two different projection illumination levels $P_d$ and $P_b$ for two types of frames (light frames and dark frames) are sufficient to span the scene dynamic range SDR. In other circumstances, the SDR may be greater than can be spanned by two types of frames, in which case more than two types of frames may be generated using more than two projection illumination levels (e.g., a bright projection illumination level, a dark projection illumination level, and one or more intermediate projection illumination levels).

The relative fraction of frames of the various types may depend on which portions of the scene dynamic range contain the objects of interest. For example, in the case of an application where the foreground object is well-lit, then there may be a larger fraction of dark frames, because less additional illumination is required to accurately image the foreground object. On the other hand, if the foreground object is dimly lit with respect to a bright background, then there may be larger fraction of bright frames than dark frames.

Figure 8:
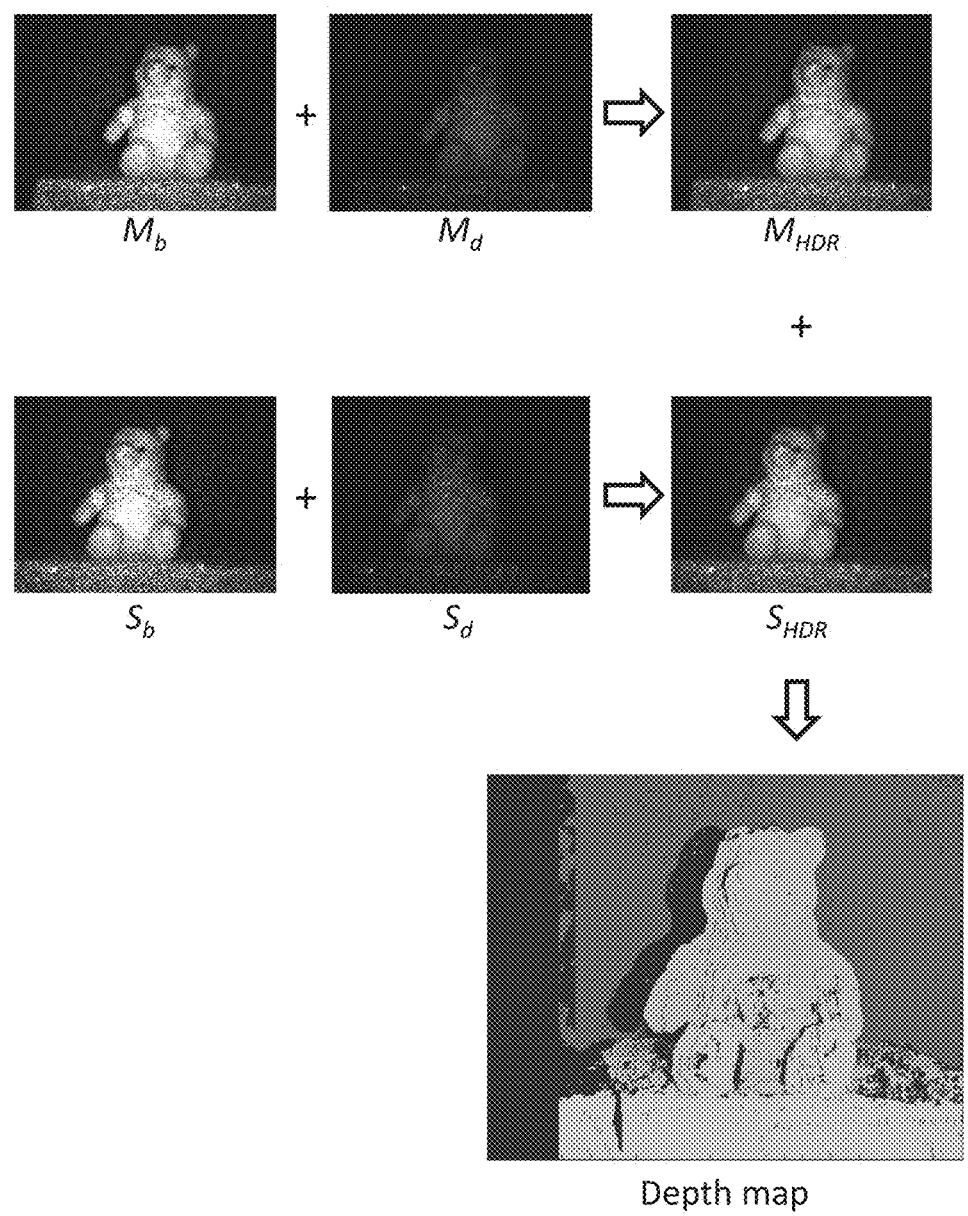
FIG. 8 is a schematic illustration of the generation of a depth map from high dynamic range images synthesized from bright and dark images according to one embodiment of the present invention.
Figure 9:
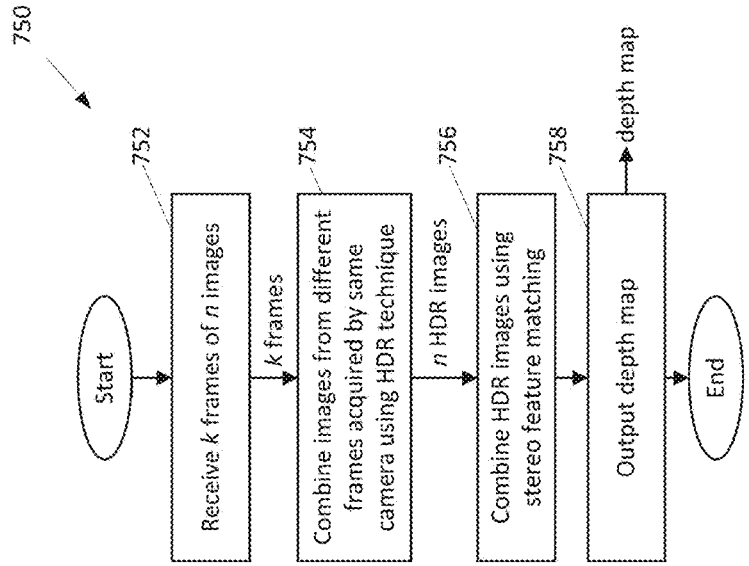
FIG. 9 is a flowchart of a method for generating a depth map from multiple high dynamic range images according to one embodiment of the present invention.

FIG. 8 is a schematic illustration of the generation of a depth map from high dynamic range images synthesized from bright and dark images according to one embodiment of the present invention. FIG. 9 is a flowchart of a method for generating a depth map from multiple high dynamic range images according to one embodiment of the present invention.

In operation 752, a processor receives k frames of n images, where each frame includes one image acquired by each of the n cameras in the depth camera system 100. For example, in the case of a depth camera system that includes two (n=2) cameras—a master camera and a slave camera—one image frame I will include a master image M and a slave image S. Each of the k frames may be captured under different exposure conditions, such as different projection source parameters P. As a result, in the case where k=2, the k frames may include a dark frame $I_d$ and a bright frame $I_b$ In operation 754, the images captured by the same camera, but in different frames are merged to generate n HDR images using high dynamic range techniques, examples of which were described above. For example, as shown in FIG. 8, the dark and bright master images $M_d$ and $M_b$ may be combined to create the master HDR image $M_{HDR}$, and the dark and bright slave images $S_d$ and $S_b$ may be combined to create the slave HDR image $S_{HDR}$. In embodiments in which k>2, images from the three or more frames may be combined to create the corresponding HDR image for each camera.

Generally, stereo three-dimensional reconstruction algorithm takes as input a frame (master and slave images) and assigns to each pixel in a subset S of pixels of the master image (where S could include the whole master image) a "disparity" value. The set of assigned disparities is called a "disparity field."

In operation 756, the n HDR images are combined using a stereo feature matching technique to generate a high depth dynamic range depth map (e.g., by measuring the disparity, as described in more detail above). For example, the fused master HDR image $M_{HDR}$ and the fused slave HDR image $S_{HDR}$ are combined to form a disparity field, and the disparity field can be used to generate a depth map, which is output in operation 758. The resulting depth map lacks the artifacts shown in FIGS. 3A and 3B because the HDR images contain substantially no saturated pixels and substantially no missing information (due to pixels being below the noise threshold of the camera).

According to one embodiment of the present invention, the processor 108 performs the operations associated with the HDDR technique. However, embodiments of the present invention are not limited thereto. For example, the process of applying the HDDR technique to the stored images may be performed by an external processor connected to the depth camera system over a communications link such as a universal serial bus (USB) connection, a wireless connection (e.g., Bluetooth® or WiFi), or a proprietary interface over which the acquired images are transferred to memory connected to the external processor. In some embodiments, the external processor is considered to be a part of the depth camera system.

Figure 10:
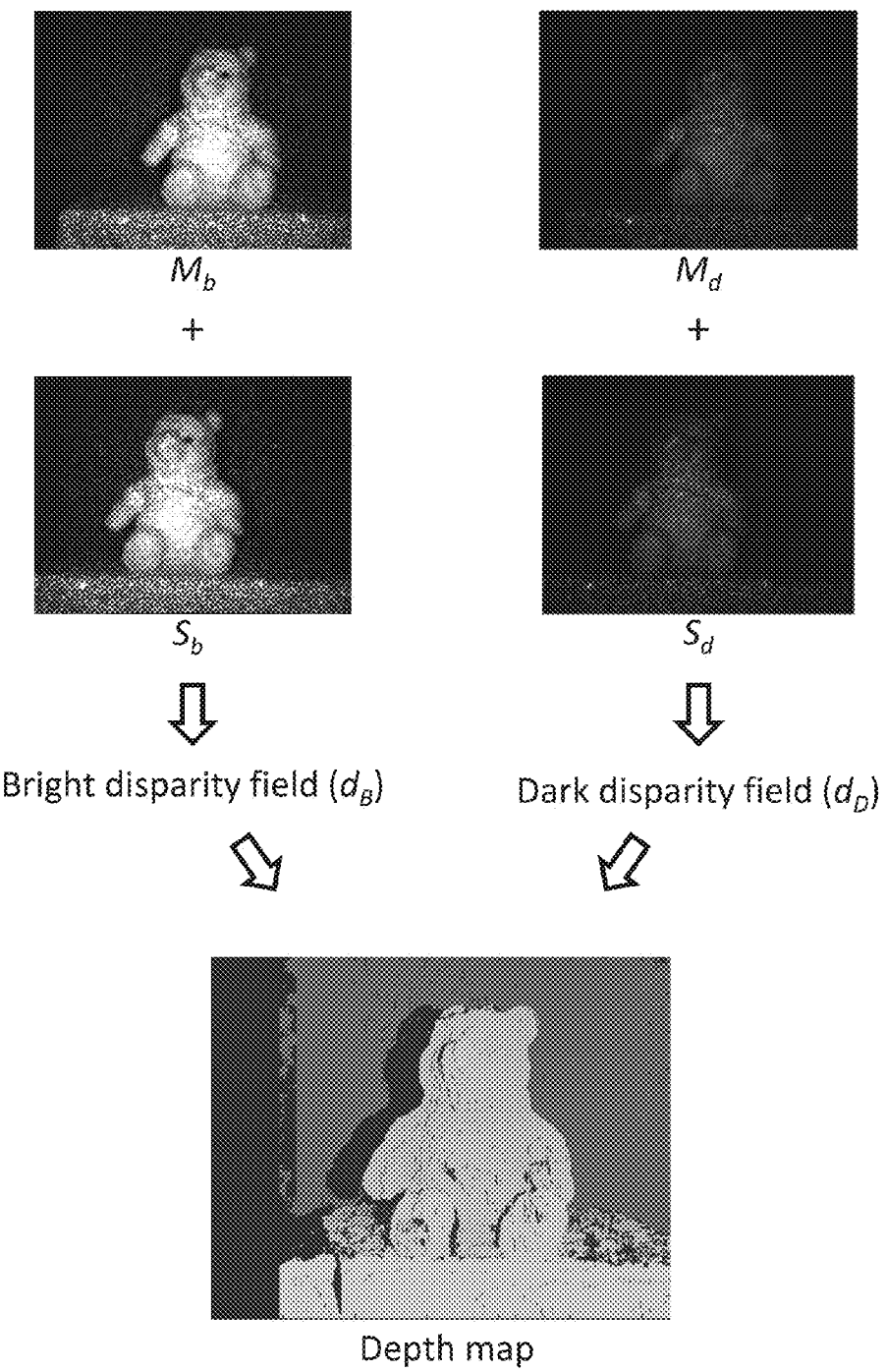
FIG. 10 is a schematic illustration of the generation of a depth map from two disparity maps synthesized from bright and dark images according to one embodiment of the present invention.
Figure 11:
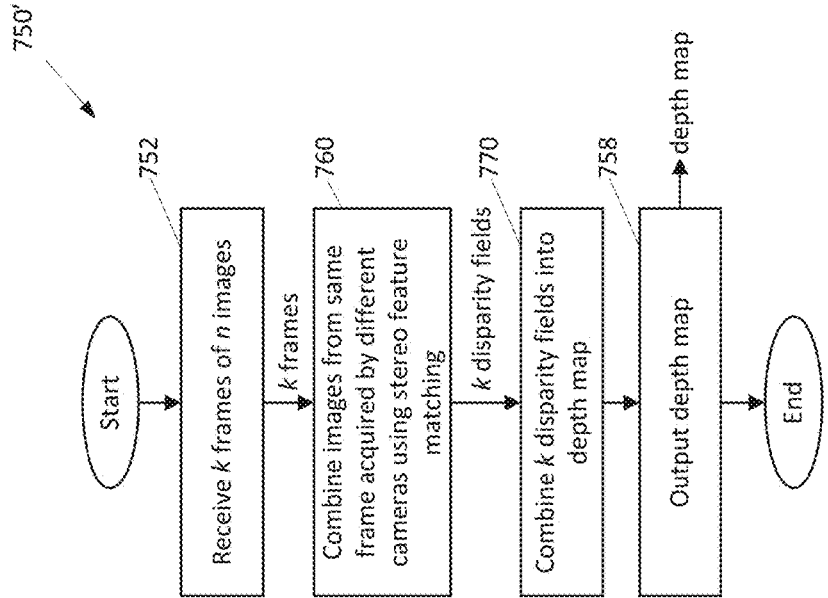
FIG. 11 is a flowchart of a method for generating a depth map from multiple disparity images according to one embodiment of the present invention.

FIG. 10 is a schematic illustration of the generation of a depth map from two disparity maps synthesized from bright and dark images according to one embodiment of the present invention. FIG. 11 is a flowchart of a method 750' for generating a depth map from multiple disparity images according to one embodiment of the present invention.

In operation 752, as discussed above with respect to FIG. 9, k frames of n images are received, where the frame includes one image from each of the n cameras of the depth camera system 100.

In operation 760, the processor combines the n images from the same frame I to generate k disparity fields, one for each of the k frames. For example, as shown in FIG. 10, in one embodiment of the present invention, the frames acquired by the master and slave cameras are processed independently for the dark frame $I_d$ (including images $M_d$ and $S_d$) and the bright frame $I_b$ (including images $M_b$ and $S_b$). This results in two disparity fields: a "bright disparity field" computed form the master bright $M_b$ and the slave bright $S_b$ images; and a "dark disparity field" computed from the master dark $M_d$ and slave dark $S_d$ images.

Rather than combining two images into a composite image, as would be the case with standard HDR techniques, in this embodiment of the present invention multiple disparity fields are combined into a composite disparity field in operation 770, where the generated composite disparity field is output in operation 758. Various appropriate algorithms can be used for this composition of disparity fields.

In one embodiment, a pixel p that has a disparity value in only one of the two disparity fields (bright disparity field or dark disparity field) is assigned this disparity value in the composite image (one or more of the disparity fields may lack a disparity value due to a failure to find a feature match for that pixel because, for example, the portion of the image containing the pixel is saturated or below the noise threshold of the sensor). If a pixel ρ has a disparity value in both the bright disparity field ($d_B$) and the dark disparity field ($d_D$), either one of these values could be assigned to the composite image. In one embodiment of the present invention, one of the disparity values $d_B$ or $d_D$ is assigned to the composite disparity field at pixel ρ by analyzing the content of a portion of the image area centered on p in the master dark image and in the master bright image. The composite disparity field at ρ is then assigned the value $d_B$ if the brighter image has no saturated pixels in this small area, and assigned the value $d_D$ otherwise.

In other embodiments of the present invention, other composition algorithms may be applied in operation 770, including algorithms that use a different criteria to decide whether to assign the value of $d_B$ or $d_D$ to the composite image at p, and algorithms that compute a mathematical function of $d_B$ or $d_D$ to determine the value to assign to the composite disparity field at µ. In some embodiments of the present invention, artifacts in the depth map arising due to the motion blur of moving objects in the scene may be reduced by calculating the disparity based on the recent images or calculating the disparity for the moving objects based on a single frame.

In some embodiments of the present invention, the active depth capture system is configured to detect image regions of the cameras subject to motion and to apply high dynamic range depth capture techniques to image regions not subject to motion. For example, motion may be detected by matching features between successive frames of images, where the speed of the objects can be determined by the distance traveled by the matching features from one frame to the next. The motion of the objects from one frame to the next can cause artifacts if the depth maps include multiple images (e.g., the depth map may include the object at two different locations). These artifacts can be reduced by restricting the calculation of depth maps for these moving objects (e.g., objects that have moved a large distance relative to previous frames) to only the disparity calculations from images from a same frame. In other words, in some embodiments, regions of the depth map containing moving objects will be calculated using only images from one frame (e.g., the most recent frame) while other, more static portions of the depth map can be calculated using a high depth dynamic range technique, by combining information from multiple frames.

Detecting areas subject to motion and compensating for motion using optical flow estimation by warping a previously acquired frame and by computing a depth estimate based on a current frame and the warped previous frame. In more detail, a moving target in front of the cameras may have different reflectance properties in different areas because the moving target may be made of different materials (e.g., portions that are plastic versus portions that are metallic). Thus, to obtain a dense depth map of the object, the information is merged from depth maps generated from frames/taken with different pattern settings ($P_d$ at frame $I^{t-1}$ and $P_b$ at frame $I^t$). Because the object is moving, a portion of an object that appears at pixel $p_i^{t-1}$ of a depth map generated from frame $I^{t-1}$ will appear in pixel $p_i^t = p_i^{t-1} + \Delta p$ in another depth map generated from frame $I^{t-1}$, where $\Delta p_i$ refers to the change in position of a feature i that appears at pixel $p_i^{t-1}$ in frame $I^{t-1}$ and in pixel $p_i^t$ in frame $I^t$. In some embodiments, the object motion is estimated by applying optical flow estimation for areas which are visible both at frame $I^t$ and frame $I^{t-1}$, and then extrapolating this motion to the other pixels of the object. This will be a sparse optical flow estimation based on depth features (e.g., a corner of an object) extracted on areas where depth is available and matches of those features can be found between the frames $I^{t-1}$ and $I^t$. In some embodiments, these features are depth features (e.g., shapes of the objects) rather than texture features (e.g., patterns or shapes on the surfaces of the objects). This estimated motion can be used to warp the depth computed at frame $I^{t-1}$ to frame $I^t$ and the depth computed at frame $I^t$ to frame $I^{t-1}$. According to another embodiment of the present invention, which does not rely on having some pixels visible on both the bright and the dark frames, the host processor 108 estimates the sparse optical flow by matching features on depth images between frames of the same type (e.g., in the case of alternating dark and light frames, features from frame $I^{t-2}$ are matched with features from frame $I^t$, and features from frame $I^{t-3}$ are matched with features from frame $I^{t-1}$) and interpolates/extrapolates the optical flow for the missing frames ($I^{t-1}$ or $I^t$).

When two or more cameras and a projector are not collocated, some portions of the scene that are visible to the cameras may not be lit by the projector, and therefore will appear dark in the captured images. These portions will be referred to herein as shadowed regions. When applying a stereoscopic algorithm to the captured images, these shadowed regions may be incorrectly matched with other shadowed regions in the images, thereby resulting in shadow artifacts in the resulting depth map. Embodiments of the present invention can remove such dark areas by increasing the illumination supplied to these areas, thereby reducing the likelihood that such shadowed regions are incorrectly matched with other shadowed regions.

As used herein, the term "processor" generally refers to one or more computing units, such as a single core or multi-core microprocessor, a graphics processing unit (GPU), an application specific integrated circuit (ASIC), a field programmable gate array (FPGA), and may also include combinations of multiple computing units, such as two microprocessors coupled to one another, a microprocessor coupled to a graphics processing unit, a microprocessor coupled to a field programmable gate array, a microprocessor coupled to both a field programmable gate array and an application specific integrated circuit, etc. As such, as the term is used herein, when one or more operations are described as being performed by "a processor," embodiments of the present invention are not limited to all of these operations being performed by a single computing unit. Instead, embodiments of the present invention also encompass the performance of these operations by multiple different computing units coupled together, where some operations are performed by one of the computing units and other operations are performed by another of the computing units.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A depth camera system comprising:
a processor;
a plurality of cameras coupled to the processor and configured to have overlapping fields of view, each camera being configured to detect light in a spectral band;
a projection source coupled to the processor and configured to emit light toward the fields of view of the cameras, wherein the projection source is configured to emit light having a pattern and in the spectral band; and
memory coupled to the processor, the memory storing instructions that, when executed by the processor, cause the processor to:
control the cameras to capture, concurrently, a plurality of first images during a first exposure interval, each of the cameras concurrently capturing a corresponding one of the first images;
control the projection source to emit light at a first illumination level during the first exposure interval;
control the cameras to capture, concurrently, a plurality of second images during a second exposure interval, each of the cameras concurrently capturing a corresponding one of the second images;
control the projection source to emit light at a second illumination level during the second exposure interval, the second illumination level being different from the first illumination level;
compute at least one disparity map based on the first images and the second images;
generate a depth map from the at least one disparity map; and
output the depth map.

2. The depth camera system of claim 1, wherein the first illumination level is a lower illumination level than the second illumination level.

3. The depth camera system of claim 2, wherein the memory further stores instructions that, when executed by the processor, cause the processor to:
control the projection source to emit light at the first illumination level during the first exposure interval by emitting light for a first emission interval having a length shorter than the first exposure interval; and
control the projection source to emit light at the second illumination level during the second exposure interval by emitting light for a second emission interval having a length longer than the first emission interval and shorter than or equal to the second exposure interval.

4. The depth camera system of claim 2, wherein the memory further stores instructions that, when executed by the processor, cause the processor to:
control the projection source to emit light at the first illumination level during the first exposure interval by emitting light at a first emission power; and
control the projection source to emit light at the second illumination level during the second exposure interval by emitting light at a second emission power greater than the first emission power.

5. The depth camera system of claim 1, wherein the cameras are infrared cameras, and
wherein the projection source is configured to emit infrared light.

6. The depth camera system of claim 5, wherein the projection source is configured to emit an infrared pattern.

7. The depth camera system of claim 1, wherein the pattern is configured to be detectable at different illumination levels.

8. The depth camera system of claim 1, wherein the cameras are configured to capture images using a global shutter.

9. The depth camera system of claim 1, wherein the memory further stores instructions that, when executed by the processor, cause the processor to control the projection source to emit light at a third illumination level, the third illumination level being different from the first illumination level and different from the second illumination level.

10. The depth camera system of claim 1, further comprising a second projection source, and
wherein the memory further stores instructions that, when executed by the processor, cause the processor to control the second projection source to emit light at a fourth illumination level different from the first illumination level and different from the second illumination level.

11. The depth camera system of claim 1, wherein the memory further stores one or more previously captured images, and
wherein the memory further stores instructions that, when executed by the processor, cause the processor to:
analyze a brightness of at least one of the one or more previously captured images; and
set the second illumination level in accordance with a comparison of the brightness with a model brightness.

12. The depth camera system of claim 11, wherein the projection source is configured to emit, selectively, one of a plurality of patterns at a time, each of the patterns corresponding to one of a plurality of illumination levels, and
wherein the second illumination level is set by selecting a pattern from the plurality of patterns.

13. The depth camera system of claim 1, wherein the memory further stores one or more previously captured images, and
wherein the memory further stores instructions that, when executed by the processor, cause the processor to:
identify first portions of the first images having features matching second portions of the second images;
detect motion portions of the second images in accordance with locations of the first portions and the second portions; and
compute portions of the depth map corresponding to the motion portions in accordance with only the second images.

14. The depth camera system of claim 1, wherein the memory further stores one or more previously captured images, and
wherein the memory further stores instructions that, when executed by the processor, cause the processor to compensate for motion using optical flow estimation by:
detecting portions of the images of the cameras subject to motion;
warping a previously captured image of the previously captured images; and
computing a depth estimate based on the second images and the warped previously captured images.

15. The depth camera system of claim 1, wherein the projection source is configured to emit structured light.

16. A method for capturing a depth map in a scene having high dynamic range, comprising:
controlling, by a processor, a plurality of cameras to capture, concurrently, a plurality of first images during a first exposure interval, each camera being configured to detect light in a spectral band and each of the cameras concurrently capturing a corresponding one of the first images, the cameras having overlapping fields of view;
controlling, by the processor, a projection source to emit light at a first illumination level during the first exposure interval, wherein the projection source is configured to emit light having a pattern and in the spectral band;
controlling, by the processor, the cameras to capture, concurrently, a plurality of second images during a second exposure interval, each of the cameras concurrently capturing a corresponding one of the second images;
controlling, by the processor, the projection source to emit light at a second illumination level during the second exposure interval, the second illumination level being different from the first illumination level;
computing, by the processor, at least one disparity map based on the first images and the second images;
generate a depth map from the at least one disparity map; and
outputting, by the processor, the depth map.

17. The method of claim 16, wherein the first illumination level is a lower illumination level than the second illumination level.

18. The method of claim 17, further comprising:
controlling, by the processor, the projection source to emit light at the first illumination level during the first exposure interval by emitting light for a first emission interval having a length shorter than the first exposure interval; and
controlling, by the processor, the projection source to emit light at the second illumination level during the second exposure interval by emitting light for a second emission interval having a length longer than the first emission interval and shorter than or equal to the second exposure interval.

19. The method of claim 17, further comprising:
controlling, by the processor, the projection source to emit light at the first illumination level during the first exposure interval by emitting light at a first emission power; and
controlling, by the processor, the projection source to emit light at the second illumination level during the second exposure interval by emitting light at a second emission power greater than the first emission power.

20. The method of claim 16, wherein the cameras are infrared cameras, and
wherein the projection source is configured to emit infrared light.

21. The method of claim 20, wherein the projection source is configured to emit an infrared pattern.

22. The method of claim 16, wherein the pattern is configured to be detectable at different illumination levels.

23. The method of claim 16, wherein the cameras are configured capture images using a global shutter.

24. The method of claim 16, further comprising controlling, by the processor, the projection source to emit light at a third illumination level, the third illumination level being different from the first illumination level and different from the second illumination level.

25. The method of claim 16, further comprising controlling a second projection source to emit light at a fourth illumination level different from the first illumination level and the second illumination level.

26. The method of claim 16, further comprising:
storing, by the processor, the first images in a memory coupled to the processor;
analyzing, by the processor, a brightness of at least one of the first images; and setting, by the processor, the second illumination second illumination level in accordance with a comparison of the brightness with a model brightness.

27. The method of claim 26, wherein the projection source is configured to emit, selectively, one of a plurality of patterns at a time, each of the patterns corresponding to one of a plurality of illumination levels, and
wherein the second illumination level is set by selecting a pattern from the plurality of patterns.

28. The method of claim 16, further comprising:
storing, by the processor, the first images and the second images in a memory coupled to the processor;
identifying, by the processor, first portions of the first images having features matching second portions of the second images;
detecting, by the processor, motion portions of the second images in accordance with locations of the first portions and the second portions; and
compute portions of the depth map corresponding to motion portions in accordance with only the second images.

29. The method of claim 16, further comprising:
storing, by the processor, the first images and the second images in a memory coupled to the processor;
detecting, by the processor, portions of the images of the cameras subject to motion;
warping, by the processor, a previously captured image of a plurality of previously captured images; and
computing, by the processor, a depth estimate based on the second images and the warped previously captured images.

30. The method of claim 16, wherein the projection source is configured to emit structured light.

* * * * *